United States Patent
Okamura

(10) Patent No.: US 12,022,047 B2
(45) Date of Patent: Jun. 25, 2024

(54) COMMUNICATION APPARATUS, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Koji Okamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/379,718

(22) Filed: Oct. 13, 2023

(65) Prior Publication Data
US 2024/0040058 A1 Feb. 1, 2024

Related U.S. Application Data

(63) Continuation of application No. 18/074,620, filed on Dec. 5, 2022, now Pat. No. 11,831,843.

(30) Foreign Application Priority Data

Dec. 13, 2021 (JP) ................................ 2021-201990

(51) Int. Cl.
*H04N 1/44* (2006.01)
*H04N 1/00* (2006.01)
*H04W 12/06* (2021.01)

(52) U.S. Cl.
CPC ....... *H04N 1/4433* (2013.01); *H04N 1/00244* (2013.01); *H04W 12/06* (2013.01)

(58) Field of Classification Search
CPC ... H04N 1/4433; H04N 1/00244; H04N 12/06
See application file for complete search history.

(56) References Cited

U.S. PATENT DOCUMENTS

| | | | |
|---|---|---|---|
| 9,888,144 B2 * | 2/2018 | Ito | .......... H04N 1/4413 |
| 10,223,041 B2 | 3/2019 | Noue | |
| 10,440,571 B2 | 10/2019 | Sakai | |
| 10,691,379 B2 | 6/2020 | Inoue | |
| 2019/0007981 A1 * | 1/2019 | Furuichi | ............... H04W 76/10 |
| 2020/0314263 A1 | 10/2020 | Sumita et al. | |

FOREIGN PATENT DOCUMENTS

| | | |
|---|---|---|
| JP | 2017-007112 A | 1/2017 |
| JP | 2017-087506 A | 5/2017 |

* cited by examiner

*Primary Examiner* — Quang N Vo
(74) *Attorney, Agent, or Firm* — VENABLE LLP

(57) ABSTRACT

A communication apparatus capable of communicating with an information processing apparatus and an access point includes an establishment unit configured to establish connection between the access point and the communication apparatus, and a control unit configured to execute, based on a fact that an authentication method used for connection between the communication apparatus and the access point is a predetermined authentication method, predetermined processing to inhibit at least part of communication between the communication apparatus and the information processing apparatus without interposing the access point.

19 Claims, 22 Drawing Sheets

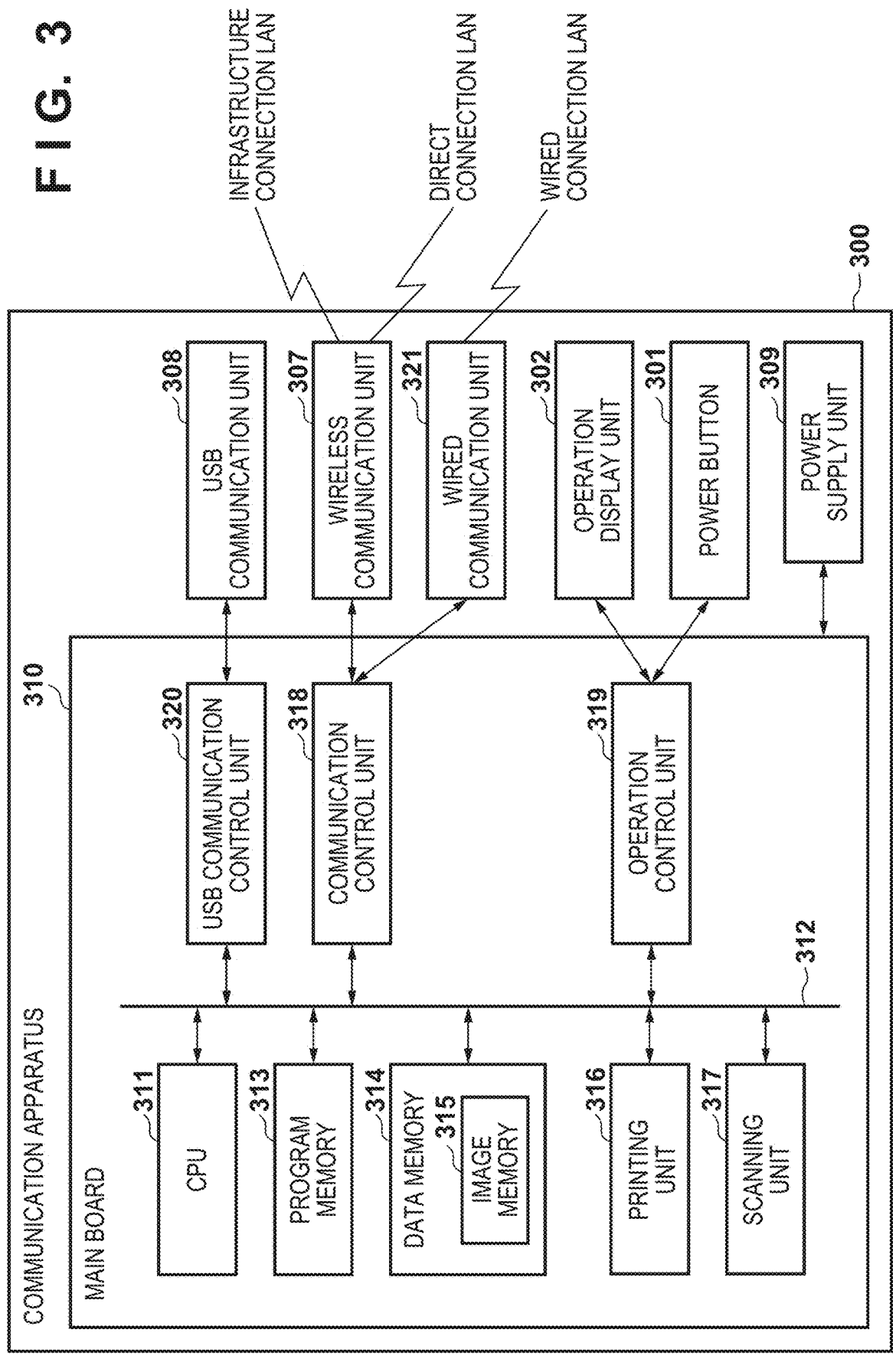

INFRASTRUCTURE CONNECTION LAN OF AUTHENTICATION METHOD IN WHICH AUTHENTICATION SERVER IS USED

INFRASTRUCTURE CONNECTION LAN OF AUTHENTICATION METHOD IN WHICH AUTHENTICATION SERVER IS NOT USED

DIRECT CONNECTION LAN

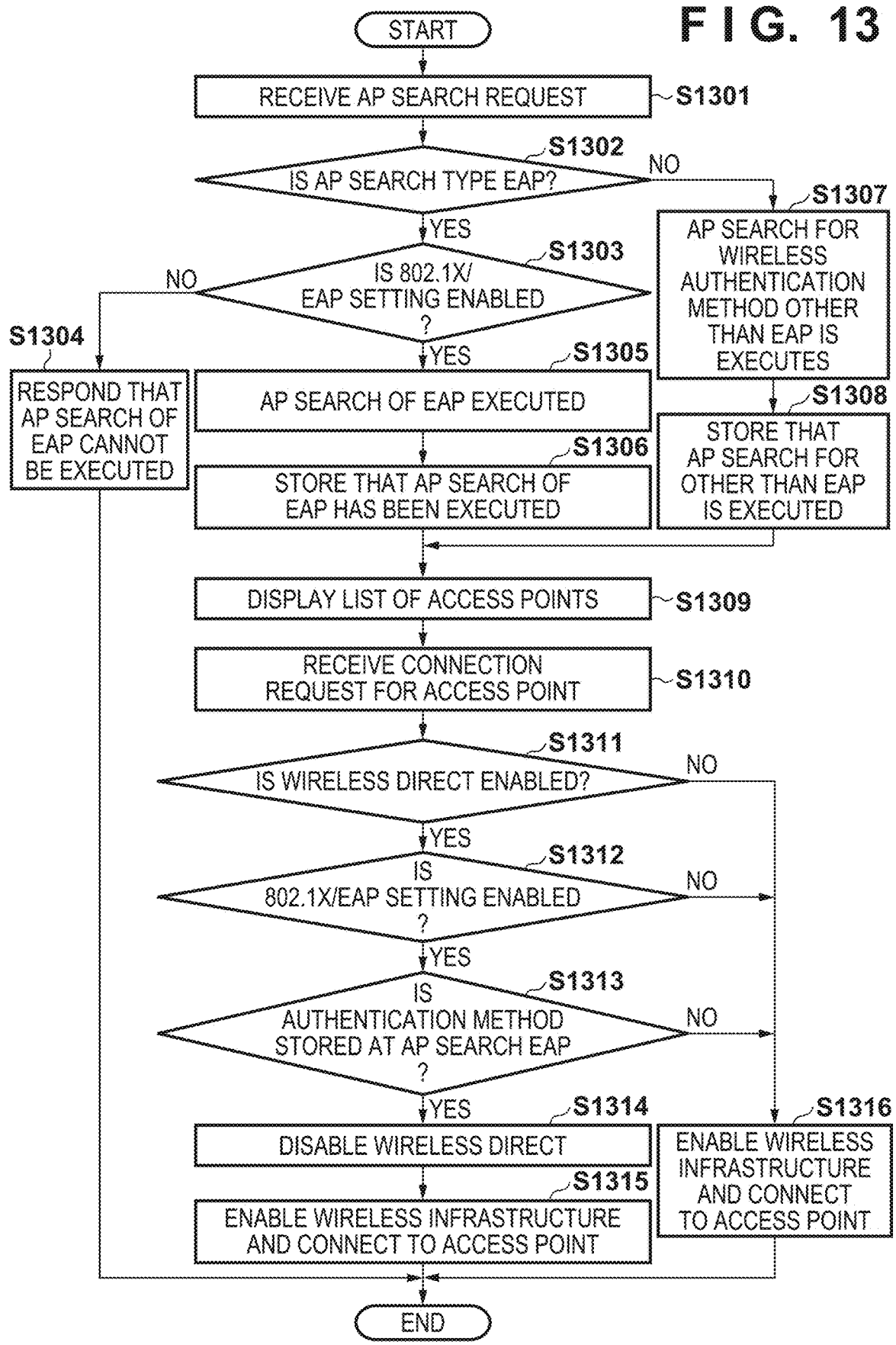

COMMUNICATION APPARATUS, CONTROL METHOD, AND NON-TRANSITORY COMPUTER-READABLE STORAGE MEDIUM STORING PROGRAM

This application is a continuation of application Ser. No. 18/074,620, filed Dec. 5, 2022.

BACKGROUND OF THE INVENTION

Field of the Invention

The present invention relates to a communication apparatus communicable with an external apparatus that requires authentication, a control method, and a non-transitory computer-readable storage medium storing a program.

Description of the Related Art

In recent years, a growing number of printing apparatuses such as multi function peripherals and printers have been equipped with wireless LAN functions. Such a printing apparatus can perform wireless LAN communication with an information processing apparatus such as a portable telephone or a personal computer operated by a user and print received print data. The printing apparatus and the information processing apparatus are connected by infrastructure connection that enables communication via a wireless LAN access point or wireless direct connection (direct connection) that allows apparatuses to directly perform wireless LAN communication without interposing a relay apparatus such as an access point. Some printing apparatuses can simultaneously execute infrastructure connection and direct connection, as in Japanese Patent Laid-Open No. 2017-87506.

The information processing apparatus, the printing apparatus, and the access point can be connected to each other by operating them according to the IEEE802.11 standard. In addition, only apparatuses permitted by authentication processing in the wireless connection procedure can be connected.

Authentication methods of wireless LAN include the Pre Shared Key (PSK) method using a PSK and the Simultaneous Authentication of Equals (SAE) method using an SAE. Also, as an authentication method that supports both wireless LAN and wired LAN, there is the EAP method for authentication of a communication apparatus to be connected to a network using an authentication server complying with IEEE802.1X/EAP.

In addition to authentication processing in the wireless connection procedure as described above, authentication processing is executed between the information processing apparatus and the printing apparatus in communication after these are wirelessly connected. Japanese Patent Laid-Open No. 2017-7112 describes that only print processing permitted by executing authentication processing at the preceding stage of the print processing is executed, and also describes that whether to execute authentication processing can be switched by a user setting. Hence, printing by unauthorized access is prevented by authentication processing in print processing of application level separately from authentication processing in wireless connection.

SUMMARY OF THE INVENTION

The present invention provides a communication apparatus that prevents a difference from occurring in the authentication level between a connection side without interposing an access point and a connection side interposing an access point, a control method, and a non-transitory computer-readable storage medium storing a program.

The present invention in its first aspect provides a communication apparatus capable of communicating with an information processing apparatus and an access point, comprising: an establishment unit configured to establish connection between the access point and the communication apparatus; and a control unit configured to execute, based on a fact that an authentication method used for connection between the communication apparatus and the access point is a predetermined authentication method, predetermined processing to inhibit at least part of communication between the communication apparatus and the information processing apparatus without interposing the access point.

The present invention in its second aspect provides a control method of a communication apparatus, comprising: establishing connection between an access point and the communication apparatus; and executing, based on a fact that an authentication method used for connection between the communication apparatus and the access point is a predetermined authentication method, predetermined processing to inhibit at least part of communication between the communication apparatus and an information processing apparatus without interposing the access point.

The present invention in its third aspect provides a non-transitory computer-readable storage medium storing a program configured to cause a computer to function to: establish connection between an access point and a communication apparatus; and execute, based on a fact that an authentication method used for connection between the communication apparatus and the access point is a predetermined authentication method, predetermined processing to inhibit at least part of communication between the communication apparatus and an information processing apparatus without interposing the access point.

According to the present invention, it is possible to prevent a difference from occurring in the authentication level between a connection side without interposing an access point and a connection side interposing an access point.

Further features of the present invention will become apparent from the following description of exemplary embodiments with reference to the attached drawings.

BRIEF DESCRIPTION OF THE DRAWINGS

FIG. 3 is a block diagram showing the arrangement of the MFP;

FIGS. 11A to 11K are views for explaining transition of a screen on the operation display unit of the MFP;

FIG. 13 is a flowchart illustrating processing of connecting the MFP to the network formed by the access point;

DESCRIPTION OF THE EMBODIMENTS

Figure 1:
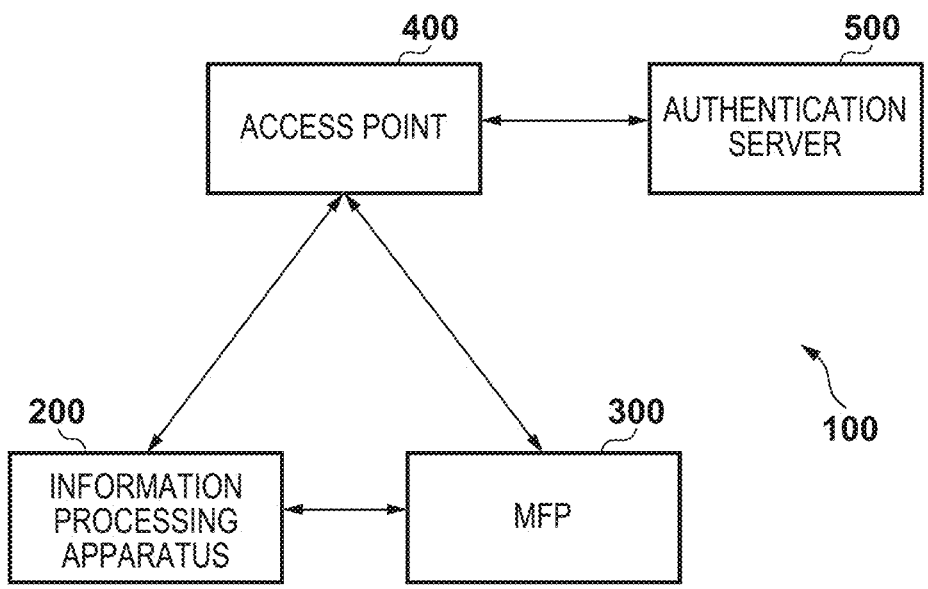
FIG. 1 is a block diagram showing a system configuration.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

If a communication apparatus can simultaneously execute connection interposing an access point and connection without interposing an access point, and the connection side interposing the access point operates by an authentication method that needs an authentication server, a difference may occur in the authentication level between the connection sides.

According to the present disclosure, it is possible to prevent a difference from occurring in the authentication level between a connection side without interposing an access point and a connection side interposing an access point.

First Embodiment

FIG. 1 is a block diagram showing an example of a system configuration according to this embodiment. A communication system 100 is a communication system in which a plurality of communication apparatuses can wirelessly communicate with each other. As shown in FIG. 1, the communication system 100 includes, as the communication apparatuses, an information processing apparatus 200, an MFP (Multi Function Peripheral) 300, an access point (AP) 400, and an authentication server 500. In the communication system 100, the information processing apparatus 200 and the MFP 300 can execute, for example, processing corresponding to a print service using wireless LAN communication.

The information processing apparatus 200 is an information processing apparatus having a communication function by a wireless LAN, a wired LAN, or the like. Note that the wireless LAN will sometimes be referred to as a Wireless LAN (WLAN) hereinafter. As the information processing apparatus 200, for example, a smartphone, a notebook PC, a tablet terminal, or a Personal Digital Assistant (PDA) is used.

The MFP 300 is an example of a printing apparatus having a printing function. The MFP 300 may have a reading function (scanner), a FAX function, and a telephone function. The MFP 300 has a communication function capable of wirelessly communicating with the information processing apparatus 200. In this embodiment, the MFP 300 will be described, but an apparatus in a form different from the MFP 300 may be used. For example, a facsimile apparatus, a scanner apparatus, a projector, a portable terminal, a smartphone, a notebook PC, a tablet terminal, a PDA, a digital camera, a music reproduction device, a television, a smart speaker, AR glasses, or the like having a communication function may be used.

The access point 400 is a communication apparatus that is provided separately from (outside) the information processing apparatus 200 and the MFP 300, and operates as a base station apparatus of a WLAN. Note that the access point 400 will sometimes be referred to as the external access point 400 or external wireless base station hereinafter. A communication apparatus having a WLAN communication function can perform communication in a WLAN infrastructure mode via the access point 400. Note that the wireless infrastructure mode will sometimes be referred to as the "wireless infrastructure mode" hereinafter. In other words, the wireless infrastructure mode is a mode in which the communication apparatus communicates the information processing apparatus 200 via the access point 400 to which the communication apparatus is connected. The access point 400 communicates with a communication apparatus (an authenticated communication apparatus) that is permitted to execute connection to the self-apparatus, and relays wireless communication between the communication apparatus and another communication apparatus. The access point 400 is connected to a wired LAN communication network to relay communication between a communication apparatus connected to the network and another communication apparatus wirelessly connected to the access point 400. If the authentication method of a network formed by the access point 400 is a method using an authentication server (if the access point 400 supports an authentication method using an authentication server), the access point 400 performs access control by authenticating, in cooperation with the authentication server 500, a communication apparatus to be connected to the network.

Communication of a communication apparatus to be connected to the network formed by the access point 400 with an apparatus other than the authentication server 500 is limited until it is authenticated. Note that the access point 400 may support an authentication method not using the authentication server. The authentication method using the authentication server and the authentication method not using the authentication server will be described in detail later.

The authentication server 500 is a communication apparatus that is provided separately from (outside) the information processing apparatus 200, the MFP 300, and the access point 400, and operates as an authentication server for comprehensively managing authentication information. The authentication server 500 authenticates, in cooperation with the access point 400, a terminal to be authenticated, and performs access control of the terminal based on an authentication result. The authentication server 500 is configured to execute authentication processing complying with, for example, the IEEE802.1X standard.

The access point 400 corresponds to an authenticator in IEEE802.1X. Furthermore, the information processing apparatus 200 and the MFP 300 correspond to supplicants in IEEE802.1X. Note that the authentication server will sometimes be referred to as the "RADIUS server" hereinafter.

The authentication server 500 performs authentication by, for example, the EAP-TLS method, the EAP-TTLS method, or the PEAP method in the IEEE802.1X standard. The EAP-Transport Layer Security (EAP-TLS) method is an authentication method using the TLS handshake protocol, and performs authentication using a server certificate and a client certificate. The EAP-Tunneled TLS (EAP-TTLS) method is an authentication method using the TLS handshake protocol, and performs authentication using a server certificate, a user name, and a password. In the Protected EAP (PEAP) method, authentication is performed using a user name and a password. Note that the information used for IEEE802.1X authentication will sometimes collectively be referred to as "authentication information" hereinafter.

The information processing apparatus 200 and the MFP 300 can execute wireless communication in a peer-to-peer mode without intervention of the external access point 400 or in the wireless infrastructure mode via the external access point 400 using their WLAN communication functions. Note that the peer-to-peer mode will sometimes be referred to as the "P2P mode" or the "wireless direct mode" in contrast to the wireless infrastructure mode hereinafter. In other words, the P2P mode is a mode in which the communication apparatus directly communicates with the information processing apparatus 200 without intervention of the access point 400. The P2P mode includes a Wi-Fi Direct© mode and a software access point (software AP) mode. Note that the Wi-Fi Direct© mode will sometimes be referred to as the WFD mode hereinafter. That is, the wireless direct mode can be said as a communication mode complying with the IEEE802.11 series.

Figure 2:
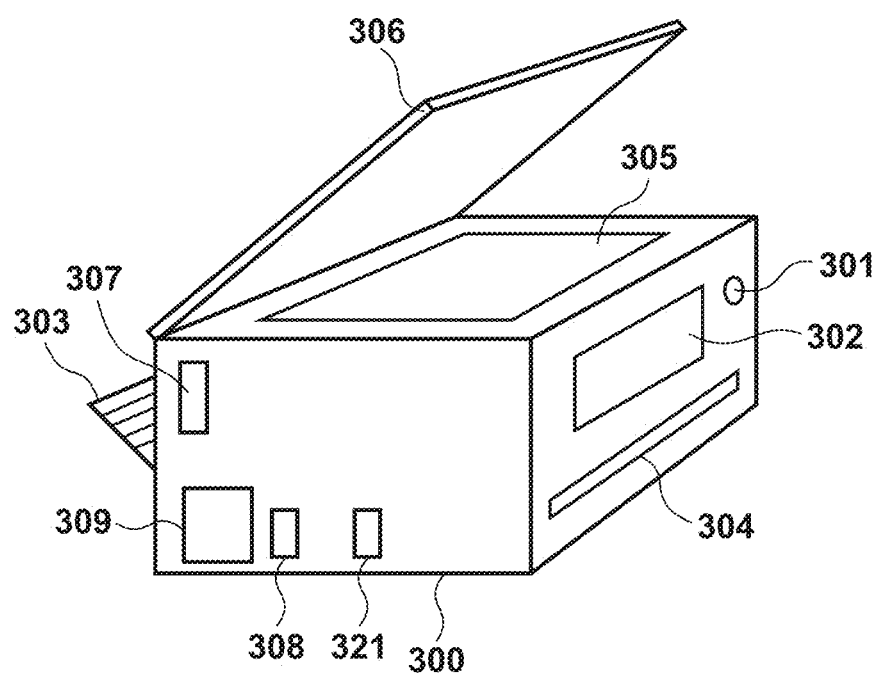
FIG. 2 is a view showing the outer appearance of an MFP.

FIG. 2 is a view showing an example of the outer appearance of the MFP 300. A power button 301 is a hardware key used by the user to turn on and off the power. An operation display unit 302 includes a display and buttons used by the user to operate the MFP 300. The operation display unit 302 includes keys such as character input keys, cursor keys, an enter key, and a cancel key, a Light Emitting Diode (LED), and a Liquid Crystal Display (LCD). The operation display unit 302 is configured to accept a user operation input when, for example, activating each function of the MFP 300 or changing various settings. The operation display unit 302 may be formed by including a touch panel display.

A print sheet insertion port 303 is an insertion port at which sheets of various sizes can be set. Sheets set at the print sheet insertion port 303 are conveyed one by one to a printing unit, undergo desired printing, and are discharged from a print sheet discharge port 304. A document table 305 is a transparent glass table and is used to read a set document by the scanner. A document cover 306 is a cover for pressing a document against the document table so as not to float when reading the document by the scanner, and preventing external light from entering the scanner unit.

The MFP 300 has a communication function by the WLAN or wired LAN, and includes a wired communication unit 321 and a wireless communication unit 307 with an antenna and the like for wireless communication. Note that the wireless communication unit 307 and the wired communication unit 321 need not always be arranged to be visually recognized from the outside. A USB communication unit 308 includes a USB connector and a circuit for performing, by the MFP 300, communication with the external information processing apparatus 200 or the like by USB connection. A power supply unit 309 is connected to an external power supply to supply power to the MFP 300.

FIG. 3 is a block diagram showing an example of the arrangement of the MFP 300. The MFP 300 includes a main board 310 that controls the overall apparatus, the power button 301, the operation display unit 302, the wireless communication unit 307, a wired communication unit 321, the USB communication unit 308, and the power supply unit 309.

The main board 310 includes a CPU 311 in the form of a microprocessor. The CPU 311 controls the MFP 300 in accordance with control programs stored in a program memory 313 in the form of a ROM connected via an internal bus 312 and contents stored in a data memory 314 in the form of a RAM. The operation of the MFP 300 described in this embodiment is implemented when, for example, the CPU 311 reads out the programs stored in the program memory 313 and executes them. The CPU 311 controls a scanning unit 317 to read a document and store read data in an image memory 315 in the data memory 314. The CPU 311 controls a printing unit 316 to print, on a print medium, the image of the read data stored in the image memory 315 in the data memory 314. The CPU 311 controls the USB communication unit 308 via a USB communication control unit 320 to perform USB communication with the external information processing apparatus 200 by USB connection. The CPU 311 controls an operation control unit 319 to accept operation information from the operation display unit 302 or the power button 301. The CPU 311 controls the operation control unit 319 to display, for example, the state of the MFP 300 or a function selection menu on the operation display unit 302. The CPU 311 controls the wireless communication unit 307 and the wired communication unit 321 via a communication control unit 318 in accordance with the operation information accepted by the operation display unit 302. For example, the CPU 311 changes the setting of the communication method and sets connection to the network in accordance with the operation information.

The wireless communication unit 307 is a unit configured to provide the WLAN communication function. That is, the wireless communication unit 307 converts data into packets and transmits the packets to another communication apparatus in accordance with the WLAN standard. The wireless communication unit 307 also reconstructs, to original data, packets from another external communication apparatus, and outputs the data to the CPU 311. The wireless communication unit 307 is configured to execute data (packet) communication in a WLAN system complying with the IEEE802.11 standard series (IEEE802.11a/b/g/n/ac/ax and the like). However, the present invention is not limited to this, and the wireless communication unit 307 may be configured to execute communication in a WLAN system complying with another standard. Note that in this embodiment, the wireless communication unit 307 can perform communication in both the 2.4- and 5-GHz frequency bands. In addition, the wireless communication unit 307 can execute communication in the WFD mode, communication in the software AP mode, communication in the wireless infrastructure mode, and the like. Note that the information processing apparatus 200 and the MFP 300 can perform wireless communication based on the WFD mode, and the wireless communication unit 307 has a software AP function or a group owner function. That is, the wireless communication unit 307 can create a communication network in the P2P mode, and decide a channel to be used for communication in the P2P mode.

The wired communication unit 321 is a unit for performing wired communication. For example, the wired communication unit 321 can perform data (packet) communication in a wired LAN (Ethernet) system complying with the IEEE802.3 series. Furthermore, in wired communication using the wired communication unit 321, it is possible to perform communication in a wired communication mode. The wired communication unit 321 is connected to the main board 310 via the bus cable or the like.

Figure 4A:
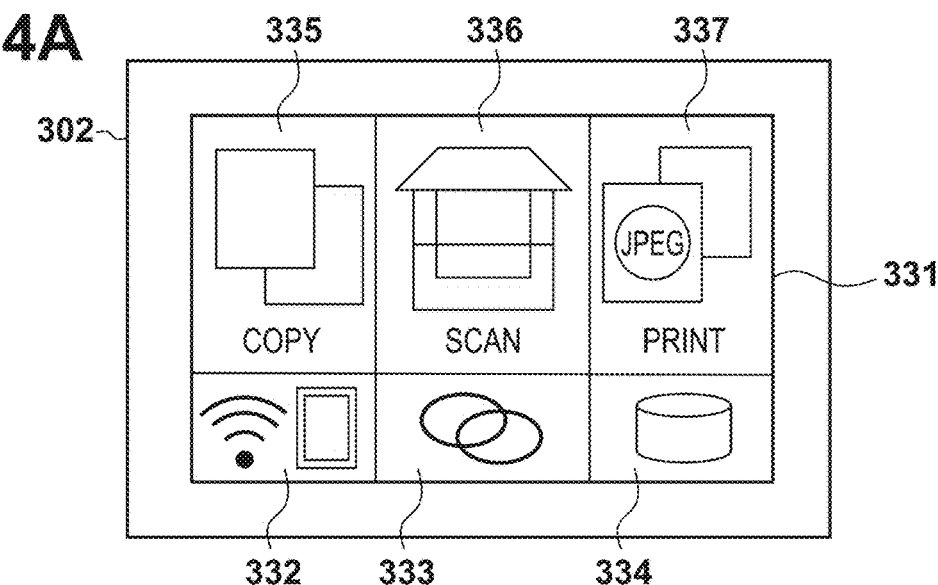
FIGS. 4A to 4C are views each schematically showing the arrangement of the operation display unit of the MFP.
Figure 4B:
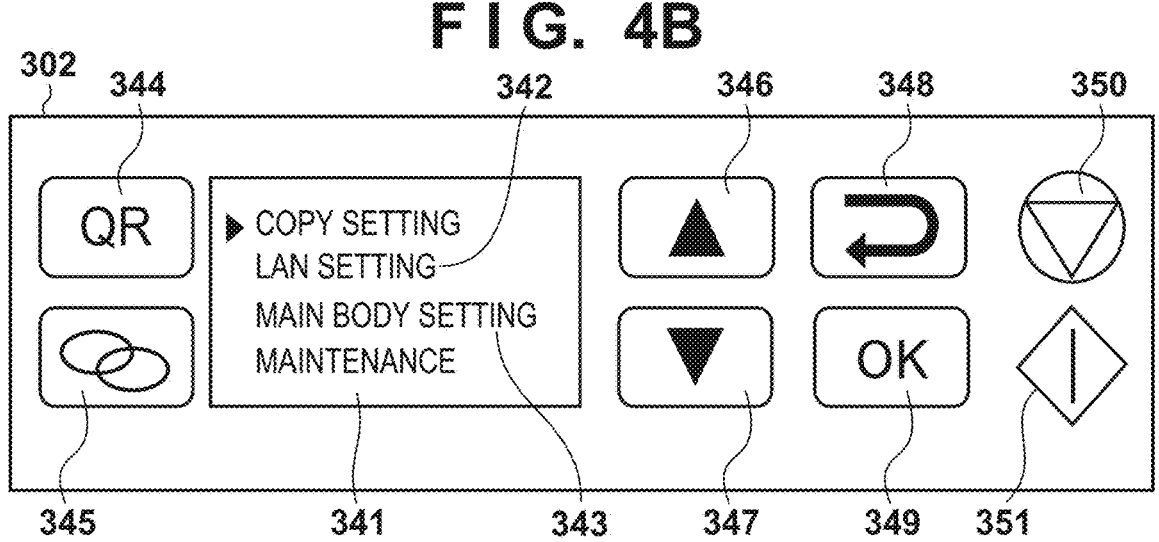
Figure 4C:
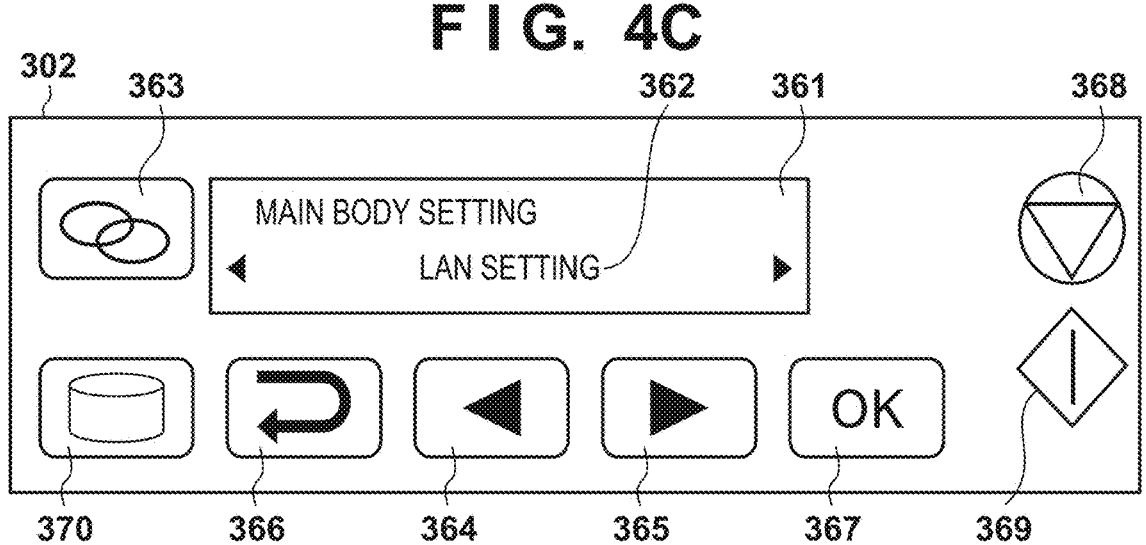

FIGS. 4A to 4C are views each schematically showing an example of the arrangement of the operation display unit 302 of the MFP 300. FIG. 4A shows an example in a case in which a touch panel display 331 forms the operation display unit 302. When the user presses the power button 301, the MFP 300 is powered on. After the MFP 300 is powered on, a home screen as the top layer of a menu operable by the user is displayed on the touch panel display 331. The home screen includes a copy region 335 for accepting a copy processing execution instruction, a scan region 336 for accepting a scan processing execution instruction, and a print region 337 for accepting a print processing execution instruction. The home screen further includes a state display region 332 indicating the settings and connection states of connection in the wireless infrastructure mode and connection in the wireless direct mode of the MFP 300. In addition, the home screen includes a connection setting mode region 333 in which the user starts an operation in the connection setting mode at an arbitrary timing, and a setting region 334 in which the user can change various settings.

FIG. 4B shows an example in a case in which a relatively small LCD display 341 and various hardware keys 344 to 351 form the operation display unit 302. If the user presses the power button 301, the MFP 300 is powered on. After the MFP 300 is powered on, a home screen as the top layer of a menu operable by the user is displayed on the LCD display 341. The user can operate a cursor displayed on the LCD display 341 by pressing the cursor move button 346 or 347. If the user wants to execute the operation, he/she presses the OK button 349. If the user wants to return to an immediately preceding menu screen, he/she presses the return button 348. If the user presses the QR button 344, a QR code including information necessary for direct connection to the MFP 300 is displayed. If the displayed QR Code® is read from the information processing apparatus 200, the information processing apparatus 200 and the MFP 300 can directly be connected to perform wireless communication. Note that the code displayed here need not always be a QR code, and a two-dimensional code suffices. If the user presses the connection setting mode button 345, the connection setting mode can be started. In the connection setting mode, by transmitting connection information from the information processing apparatus 200 to the MFP 300, the MFP 300 can be connected to the access point 400. If the user presses the stop button 350 while the MFP 300 executes each process, the processing is canceled. If the user presses the copy start button 351, a document set on the document table 305 is scanned to execute printing.

FIG. 4C shows an example in a case in which a relatively small LCD display 361 and various hardware keys 363 to 370 form the operation display unit 302. If the user presses the power button 301, the MFP 300 is powered on. After the MFP 300 is powered on, a home screen as the top layer of a menu operable by the user is displayed on the LCD display 361. By pressing the move button 364 or 365, the user can operate an item displayed on the LCD display 361. If the user wants to execute the operation, he/she presses the OK button 367. If the user wants to return to an immediately preceding menu screen, he/she presses the return button 366. If the user presses the connection setting mode button 363, the connection setting mode can be started. In the connection setting mode, by transmitting connection information from the information processing apparatus 200 to the MFP 300, the MFP 300 can be connected to the access point 400. If the user presses the stop button 368 while the MFP 300 executes each process, the processing is canceled. If the user presses the copy start button 369, a document set on the document table 305 is scanned to execute printing. If the user presses the setting button 370, he/she can change the various settings.

Figure 5:
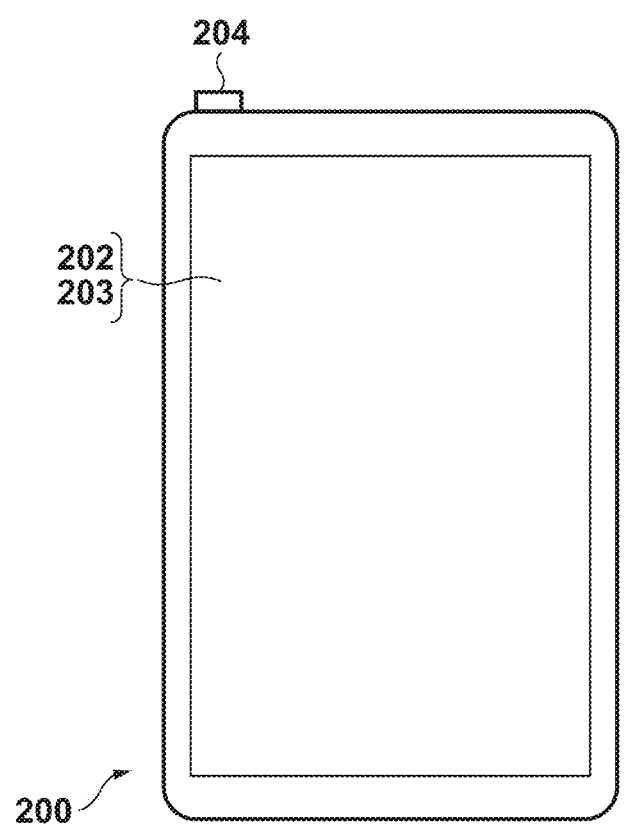
FIG. 5 is a view showing the outer appearance of an information processing apparatus.

FIG. 5 is a view showing an example of the outer appearance of the information processing apparatus 200. This embodiment will exemplify a case in which the information processing apparatus 200 is a smartphone (portable terminal) in a general form. Note that the information processing apparatus 200 includes, for example, a display unit 202, an operation unit 203, and a power key 204. The display unit 202 is, for example, a display including a Liquid Crystal Display (LCD) type display mechanism. Note that the display unit 202 may display information using a Light Emitting Diode (LED) or the like. Furthermore, the information processing apparatus 200 may have a loudspeaker function of outputting information by an audio in addition to or instead of the display unit 202. The operation unit 203 includes hardware keys such as keys and buttons or a touch panel to detect a user operation. Note that in this embodiment, the display unit 202 and the operation unit 203 are implemented by a single device to display information on the display unit 202 and accept a user operation by the operation unit 203 using a common touch panel display. In this case, for example, button icons and a software keyboard are displayed using the display function of the display unit 202, and touch operations of the user for them are detected by the operation acceptance function of the operation unit 203. Note that the display unit 202 and the operation unit 203 may be separated and a display hardware component and an operation acceptance hardware component may individually be configured. The power key 204 is a hardware key for accepting a user operation of turning on or off the power of the information processing apparatus 200.

Figure 6:
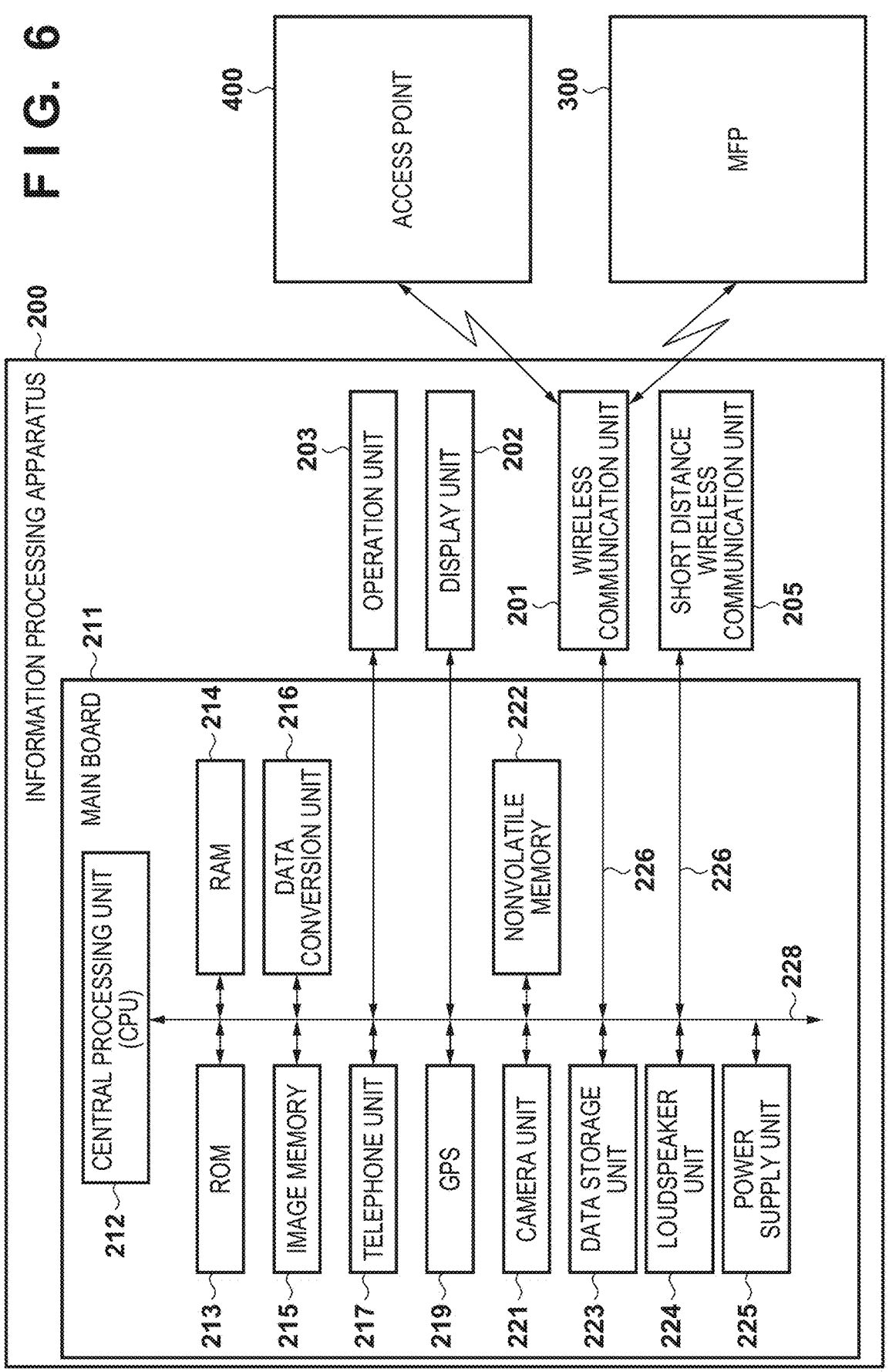
FIG. 6 is a block diagram showing the arrangement of the information processing apparatus.

The information processing apparatus 200 includes a wireless communication unit 201 that provides a WLAN communication function, as shown in FIG. 6. The wireless communication unit 201 is configured to execute data (packet) communication in a WLAN system complying with, for example, the IEEE802.11 standard series (IEEE802.11a/b/g/n/ac/ax and the like). However, the present invention is not limited to this, and the wireless communication unit 201 may be able to execute communication in a WLAN system complying with another standard. Note that in this embodiment, the wireless communication unit 201 can perform communication in both the 2.4- and 5-GHz frequency bands. The wireless communication unit 201 can execute communication in the WFD mode, communication in the software AP mode, communication in the wireless infrastructure mode, and the like.

FIG. 6 is a block diagram showing an example of the arrangement of the information processing apparatus 200. The information processing apparatus 200 includes a main board 211 that controls the overall apparatus, the wireless communication unit 201 that performs WLAN communication, the display unit 202, the operation unit 203, and a short distance wireless communication unit 205 that performs wireless communication different from that of the wireless communication unit 201. The main board 211 includes, for example, a CPU 212, a ROM 213, a RAM 214, an image memory 215, a data conversion unit 216, a telephone unit 217, a GPS 219, a camera unit 221, a nonvolatile memory 222, a data storage unit 223, a loudspeaker unit 224, and a power supply unit 225. Note that GPS is an abbreviation for Global Positioning System. These functional units in the main board 211 are connected to each other via a system bus 228. The main board 211 and the wireless communication unit 201, and the main board 211 and the short distance wireless communication unit 205 are connected via, for example, dedicated buses 226, respectively. The main board 211 and the display unit 202, and the main board 211 and the operation unit 203 are also connected via, for example, dedicated buses, respectively.

The CPU 212 serves as a system control unit, and controls the overall information processing apparatus 200. The operation of the information processing apparatus 200 described in this embodiment is implemented when, for example, the CPU 212 reads out programs stored in the ROM 213 and executes them. Note that dedicated hardware for each process may be prepared. The ROM 213 stores control programs to be executed by the CPU 212, an embedded operating system (OS) program, and the like. The CPU 212 executes each control program stored in the ROM 213 under the management of the embedded OS stored in the ROM 213, thereby performing software control such as scheduling or task switching. The RAM 214 is implemented by a Static RAM (SRAM) or the like. The RAM 214 stores data such as program control variables, setting values registered by the user, and management data of the information processing apparatus 200. The RAM 214 can be used as various work buffers. The image memory 215 is implemented by a memory such as a Dynamic RAM (DRAM). The image memory 215 temporarily stores image data received via the wireless communication unit 201 and those read out from the data storage unit 223 so as to be processed by the CPU 212. The nonvolatile memory 222 is implemented by a memory such as a flash memory, and continuously stores data even after the information processing apparatus 200 is powered off. Note that the memory arrangement of the information processing apparatus 200 is not limited to the above-described one. For example, the image memory 215 and the RAM 214 may share a memory, or data may be backed up using the data storage unit 223. In this embodiment, an example of the image memory 215 is a DRAM. However, another storage medium such as a hard disk or a nonvolatile memory may be used.

The data conversion unit 216 can execute analysis of data of various formats, and data conversion such as color conversion and image conversion. The telephone unit 217 controls a telephone line, and implements telephone communication by processing audio data input/output via the loudspeaker unit 224 including a microphone and a loudspeaker. The GPS 219 acquires position information such as the current latitude and longitude of the information processing apparatus 200 by receiving a radio wave sent from a satellite. The camera unit 221 has a function of electronically recording and encoding an image input via a lens. Image data obtained by image capturing of the camera unit 221 is saved in the data storage unit 223. The loudspeaker unit 224 executes control to implement a function of inputting/outputting a speech for a telephone function, an alarm notification function, and the like. The power supply unit 225 is, for example, a portable battery, and controls power supply to the apparatus. The power supply state of the information processing apparatus 200 includes, for example, a battery dead state in which there is no remaining battery amount, a power-off state in which the power key 204 is not pressed, a power-on state (active state) in which the power key 204 is pressed, and a power saving state in which the apparatus is active but set in the power saving mode to suppress the power consumption of each element. The display unit 202 electronically controls the display contents to execute control for, for example, displaying various input contents and the operation state and status condition of the MFP 300. In response to acceptance of a user operation, the operation unit 203 executes control for, for example, generating an electrical signal corresponding to the operation and outputting it to the CPU 212.

The information processing apparatus 200 performs wireless communication using the wireless communication unit 201, and performs data communication with another communication apparatus such as the MFP 300. The wireless communication unit 201 converts data into packets, and transmits the packets to another communication apparatus. Furthermore, the wireless communication unit 201 reconstructs, to original data, packets from another external communication apparatus, and outputs the data to the CPU 212. The wireless communication unit 201 is a unit for implementing communication complying with a standard such as the WLAN standard. The short distance wireless communication unit 205 performs communication by a communication method different from that of the wireless communication unit 201, for example, Bluetooth®. The configuration of the main board 211 is not limited to the above-described example. For example, each function of the main board 211 implemented by the CPU 212 may be implemented by a processing circuit such as an Application Specific Integrated Circuit (ASIC), and may be implemented by either hardware or software.

Figure 7:
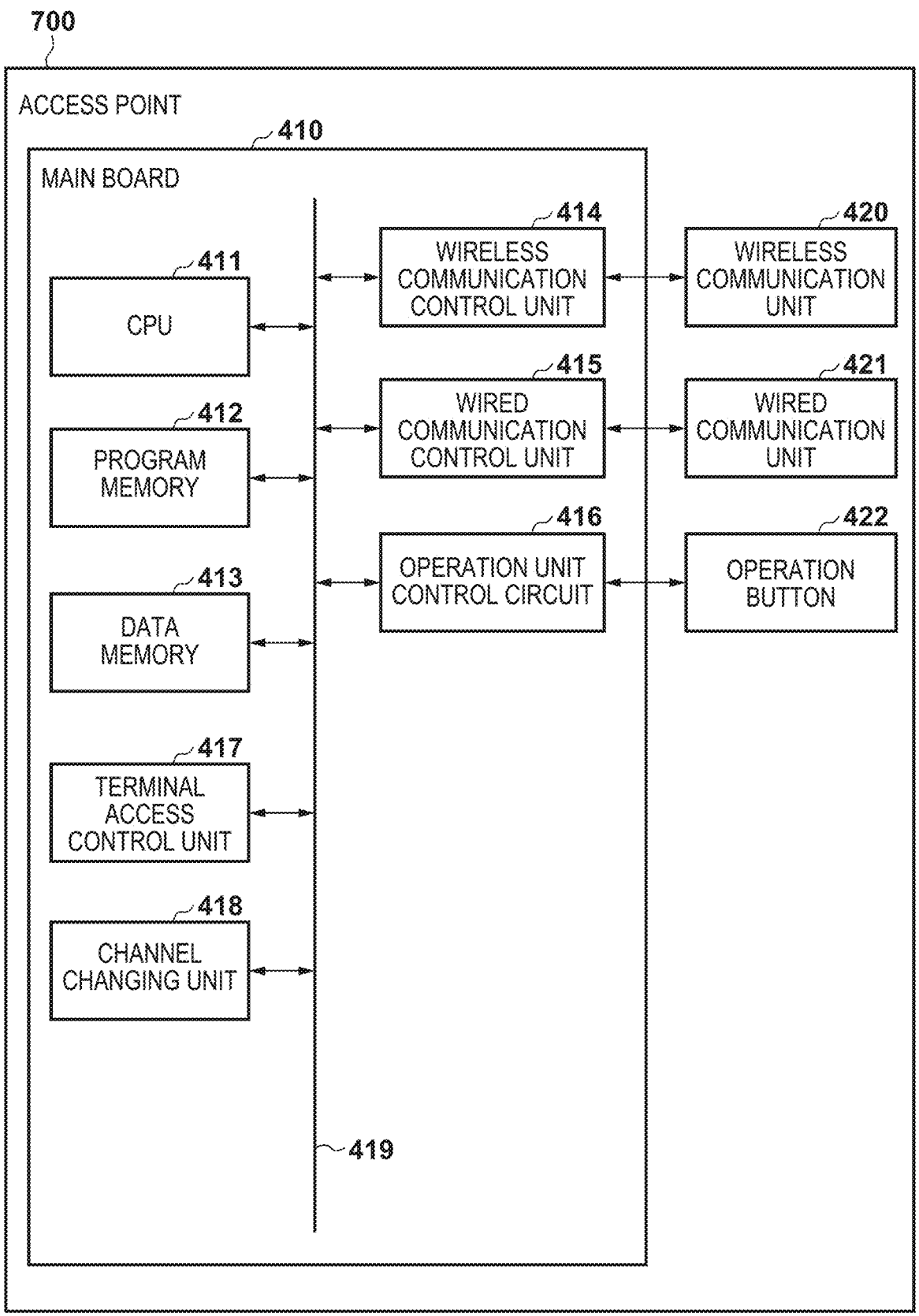
FIG. 7 is a block diagram showing the arrangement of an access point.

FIG. 7 is a block diagram showing an example of the arrangement of the access point 400 having a wireless LAN access point function. The access point 400 includes a main board 410 that controls the access point 400, a wireless communication unit 420, a wired communication unit 421, and an operation button 422. These are connected via an internal bus 419 to be communicable with each other.

In the main board 410, a CPU 411 in the form of a microprocessor is provided. The CPU 411 operates in accordance with control programs stored in a program memory 412 in the form of a ROM connected via the internal bus 419 and contents stored in a data memory 413 in the form of a RAM. The operation of the access point 400 according to this embodiment is implemented when, for example, the CPU 411 reads out the programs stored in the program memory 412 and executes them. The CPU 411 controls the wireless communication unit 420 via a wireless communication control unit 414 to perform wireless LAN communication with another communication apparatus. The CPU 411 controls the wired communication unit 421 via a wired communication control unit 415 to perform wired LAN communication with another communication apparatus. The CPU 411 accepts an operation from the user by the operation button 422 via an operation unit control circuit 416.

The access point 400 includes a terminal access control unit 417. The terminal access control unit 417 protects the network by authenticating a communication apparatus to be connected to the network. The terminal access control unit 417 authenticates a communication apparatus to be connected to the network by various methods. The various methods include, for example, the PSK method using a Pre Shared Key (PSK), the SAE method using a Simultaneous Authentication of Equals (SAE), and the EAP method using the authentication server 500 complying with IEEE802.1X/ EAP. A thus authenticated communication channel can be changed or switched by a channel changing unit 418. Note that in this embodiment, the authentication method not using the authentication server is the PSK method or the SAE method, and the authentication method using the authentication server is the EAP method. Also, the authentication method not using the authentication server is also called a Personal method, and the authentication method using the authentication server is also called an Enterprise method.

Figure 8:
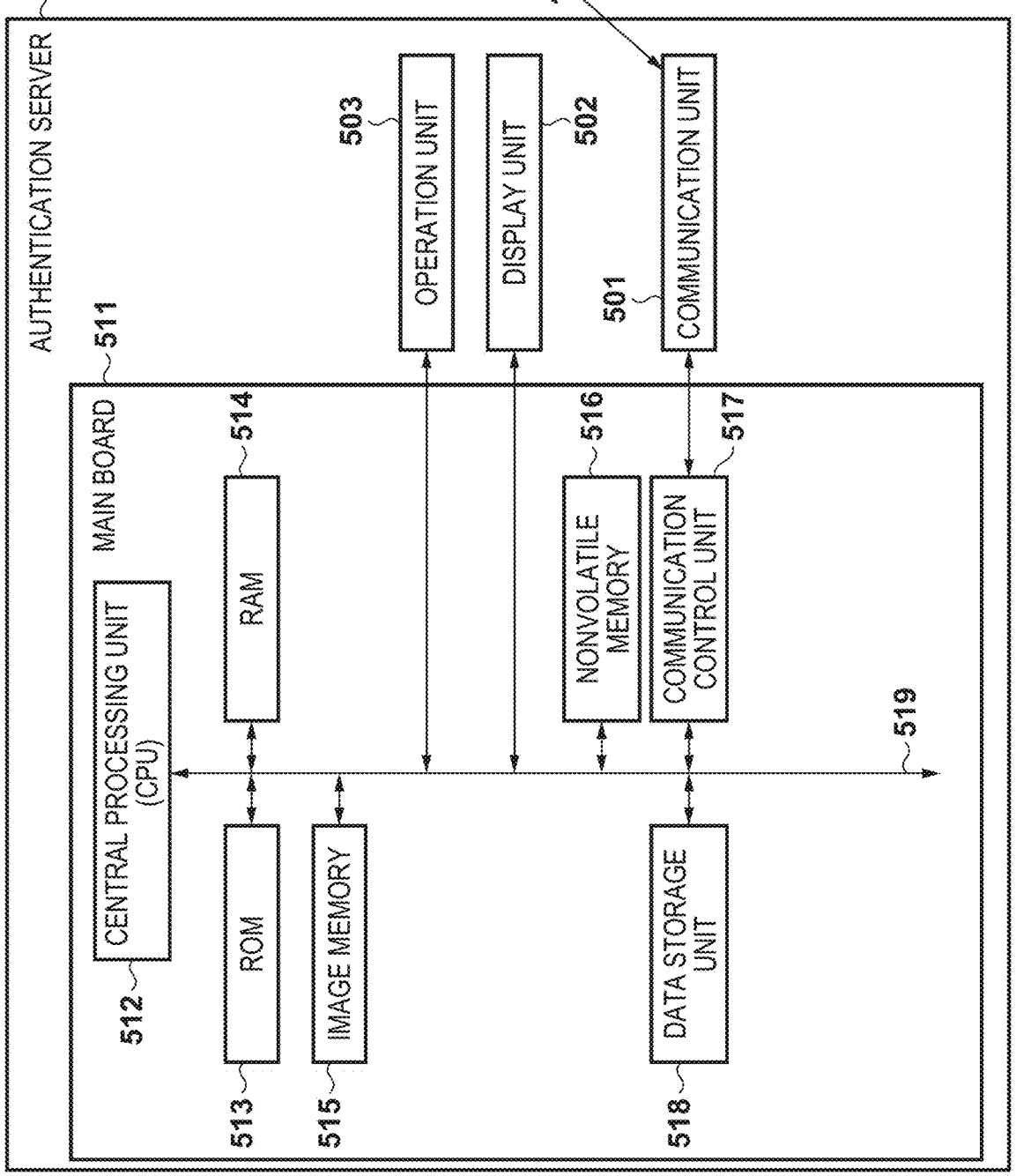
FIG. 8 is a block diagram showing the arrangement of an authentication server.

FIG. 8 is a block diagram showing an example of the arrangement of the authentication server 500. The authentication server 500 includes a main board 511 that controls the authentication server 500, a communication unit 501 that performs wired LAN communication and the like, a display unit 502, and an operation unit 503. The main board 511 includes a CPU 512, a ROM 513, a RAM 514, an image memory 515, a nonvolatile memory 516, a data storage unit 518, and a communication control unit 517. The functional units in the main board 511 are connected to each other via a system bus 519. The main board 511 and the communication unit 501, the main board 511 and the display unit 502, and the main board 511 and the operation unit 503 are connected via, for example, dedicated buses, respectively.

The CPU 512 serves as a system control unit, and controls the overall authentication server 500. The operation of the authentication server 500 according to this embodiment is implemented when, for example, the CPU 512 reads out programs stored in the ROM 513 and executes them. Note that dedicated hardware for each process may be prepared. The ROM 513 stores control programs to be executed by the CPU 512, an embedded operating system (OS) program, and the like. The CPU 512 executes each control program stored in the ROM 513 under the management of the embedded OS stored in the ROM 513, thereby performing software control such as scheduling or task switching. The RAM 514 is implemented by a Static RAM (SRAM) or the like. The RAM 514 stores data such as program control variables, setting values registered by the user, and management data of the authentication server 500. The RAM 514 can be used as various work buffers. The image memory 515 is implemented by a memory such as a Dynamic RAM (DRAM). The image memory 515 temporarily stores image data received via the communication unit 501 and those read out from the data storage unit 518 so as to be processed by the CPU 512. The data storage unit 518 is implemented by a storage medium such as a Solid State Drive (SSD), and continuously stores data even after the authentication server 500 is powered off. In this embodiment, the SSD is exemplified as an example of the data storage unit 518. However, another storage medium such as a hard disk or nonvolatile memory may be used. The display unit 502 electronically controls the display contents to execute control for, for example, displaying various input contents and the status condition. In response to acceptance of a user operation, the operation unit 503 executes control for, for example, generating an electrical signal corresponding to the operation and outputting it to the CPU 512.

The CPU 512 controls the communication control unit 517 to perform communication using the communication unit 501, thereby performing data communication with another communication apparatus such as the access point 400. The communication unit 501 converts data into packets, and transmits the packets to another communication apparatus. Furthermore, the communication unit 501 reconstructs, to original data, packets from another external communication apparatus, and outputs the data to the CPU 512. The communication unit 501 can perform data (packet) communication in a wired LAN (Ethernet) system complying with, for example, the IEEE802.3 series.

The communication modes in which the communication apparatuses in the communication system 100 can operate will be described below.

[Wireless Direct Mode]

A communication method in the wireless direct mode in which apparatuses directly, wirelessly communicate with each other without intervention of an external access point in WLAN communication will be described. Communication in the wireless direct mode can be implemented using a plurality of methods. For example, a communication apparatus executes communication in the wireless direct mode by selectively using one of the above-described wireless direct modes. Note that communication in the wireless direct mode will sometimes be referred to as "wireless direct communication" or "P2P communication" hereinafter.

For example, a communication apparatus capable of executing wireless direct communication is configured to support at least one of the software AP mode and the Wi-Fi Direct (WFD) mode. On the other hand, a communication apparatus capable of executing wireless direct communication need not support all the modes, and may be configured to support some of the modes. In this embodiment, the communication apparatus can support the wireless infrastructure mode in addition to the wireless direct modes.

A communication apparatus (for example, the information processing apparatus 200) having the communication function in the WFD mode calls an application for implementing the communication function by accepting a user operation via an operation unit. Then, the communication apparatus executes communication in the WFD mode based on a user operation accepted via a user interface screen provided by the application. Note that the MFP 300 operating in the P2P mode operates as a master in connection/communication to/with another apparatus. Note that the WFD mode is not limited to this, and the MFP 300 may operate as a station by executing group owner negotiation.

[Wireless Infrastructure Mode]

In contrast to the wireless direct mode, in the wireless infrastructure mode, communication apparatuses which communicate with each other are connected to an external access point that controls a network and communication between the communication apparatuses is performed via the external access point. In this example, the communication apparatuses are, for example, the information processing apparatus 200 and the MFP 300. In other words, communication between the communication apparatuses is executed via the network created by the external access point. The MFP 300 operating in the wireless infrastructure mode operates as a station in connection/communication to/with the access point 400. In the wireless infrastructure mode, each communication apparatus searches for an external access point by transmitting an apparatus search request (Probe Request). If each communication apparatus receives an apparatus search response (Probe Response) from the external access point, it displays an SSID included in the Probe Response. For example, each of the information processing apparatus 200 and the MFP 300 finds the access point 400, transmits a connection request to the access point 400, and is connected to the access point 400, thereby enabling communication between these communication apparatuses in the wireless infrastructure mode via the access point 400. Note that a plurality of communication apparatuses may be connected to different access points. In this case, when data transfer is performed between the access points, communication between the communication apparatuses is possible. As commands and parameters transmitted/received via the access point at the time of communication between the communication apparatuses, commands and parameters defined by the Wi-Fi standard are used. In the above-described arrangement, the access point 400 decides the frequency band and the frequency channel. Therefore, the access point 400 selects one of the 5- and 2.4-GHz frequency bands to be used and selects the frequency channel to be used in the frequency band.

When the information processing apparatus 200 or the MFP 300 is connected to the wireless LAN formed by the access point 400, the access point 400 performs authentication. The information processing apparatus 200 or the MFP 300 is authenticated by the authentication method of the wireless LAN formed by the access point 400, and can thus be connected to the wireless LAN. Examples of the authentication method of the wireless LAN include the PSK method using a PSK, the SAE method using an SAE, and the EAP method using the authentication server complying with IEEE802.1X/EAP.

[Wired Communication Mode]

The wired communication mode is a communication mode in which communication apparatuses communicate with each other by a wired LAN or the like. When operating in the wired communication mode, the MFP 300 cannot operate in the wireless infrastructure mode. In the wired communication mode, for example, data (packet) communication in the wired LAN (Ethernet) complying with the IEEE802.3 series is performed. When operating in a state in which the IEEE802.1X/EAP setting is enabled, the MFP 300 executes IEEE802.1X authentication to be connected to the wired LAN formed by the access point 400.

[Wireless Simultaneous Operation]

If communication in the two modes, that is, communication in the wireless infrastructure mode and communication in the wireless direct mode are each communication communicated by the authentication method not using the authentication server 500, the MFP 300 can execute communications in the respective modes simultaneously (in parallel). That is, connections for executing communications in the respective modes can be maintained simultaneously. More specifically, for example, communication in the wireless infrastructure mode and communication in the wireless direct mode can be executed simultaneously. Therefore, the MFP 300 maintains both connection for communication in the wireless infrastructure mode and connection for communication in the wireless direct mode simultaneously. This operation may be expressed as a "wireless simultaneous operation". In other words, the wireless simultaneous operation is, for example, an operation in which the MFP 300 simultaneously executes an operation as a station in Wi-Fi communication in the wireless infrastructure mode and an operation as a master in Wi-Fi communication in the P2P mode. On the other hand, if the MFP 300 performs communication by the authentication method using the authentication server 500, it does not maintain infrastructure connection and P2P connection simultaneously.

Depending on the setting, connection can be done without performing authentication in the wireless direct mode. For this reason, if access management is performed by the authentication server 500 on the connection side in the wireless infrastructure mode, a deviation occurs in the authentication level to access the MFP 300. In this embodiment, to prevent such a deviation in authentication, in a state in which an operation using the authentication server 500 is performed on the connection side in the wireless infrastructure mode, connection in the wireless direct mode is limited in the MFP 300. Limitation of connection will be described later with reference to FIGS. 13 to 15.

Next, user interface screens displayed on the operation display unit 302 of the MFP 300 and the display unit 202 of the information processing apparatus 200 to connect the MFP 300 to the network of the access point 400 of the authentication method using the authentication server 500 will be described.

Figure 11A:
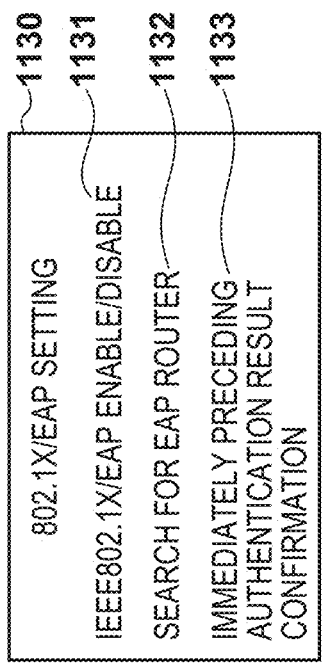

FIGS. 11A to 11K are views for explaining transition of a screen when a LAN setting 342 is selected from the setting menu of the screen 341 shown in FIG. 4B on the operation display unit 302 of the MFP 300. A screen 1100 shown in FIG. 11A is a screen which is displayed when the "LAN setting" 342 is selected in the screen 341 shown in FIG. 4B and in which the user can change the LAN setting. In the screen 1100, for example, wireless LAN 1101, wired LAN 1102, wireless direct 1103, and common setting 1104 are displayed.

Figure 11B:
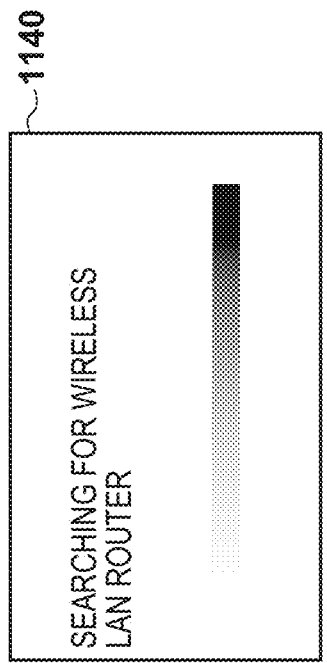

A screen 1110 shown in FIG. 11B is a screen which is displayed when the "wireless LAN" 1101 is selected in the screen 1100 shown in FIG. 11A and in which the user can change the wireless LAN setting. In the screen 1110, for example, wireless LAN enable/disable 1111, wireless LAN setup 1112, wireless LAN setting display 1113, and advanced setting 1114 are displayed. The wireless LAN enable/disable 1111 is a region for enabling or disabling a state in which the MFP 300 can perform communication using the wireless LAN. When a user operation is accepted in a display screen after the region is selected, the state in which the MFP 300 can perform communication using the wireless LAN is disabled or enabled. Note that in a state in which that state is disabled, the MFP 300 executes no communication or connection using the wireless LAN.

Figure 11C:
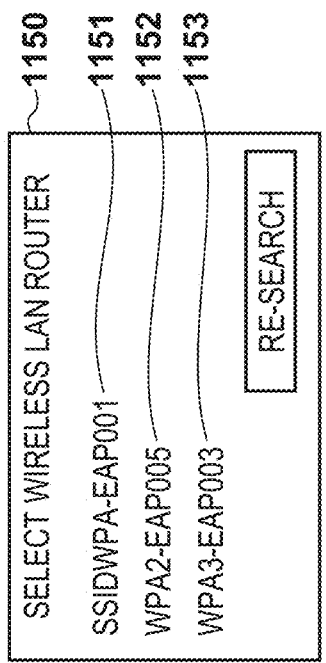
Figure 11D:
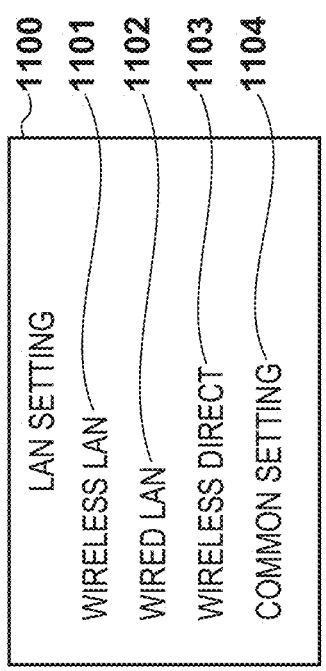

A screen 1120 shown in FIG. 11C is a screen which is displayed when the "advanced setting" 1114 is selected in the screen 1110 shown in FIG. 11B and in which the user can change the LAN advanced setting. In the screen 1120, for example, TCP/IP setting 1121 and 802.1X/EAP setting 1122 are displayed. A screen 1130 shown in FIG. 11D is a screen which is displayed when "802.1X/EAP setting" 1122 is selected in the screen 1120 shown in FIG. 11C and in which the user can change the IEEE802.1X/EAP setting. In the screen 1130, for example, IEEE802.1X/EAP enable/disable 1131, EAP router search 1132, and immediately preceding authentication result confirmation 1133 are displayed.

Figure 11E:
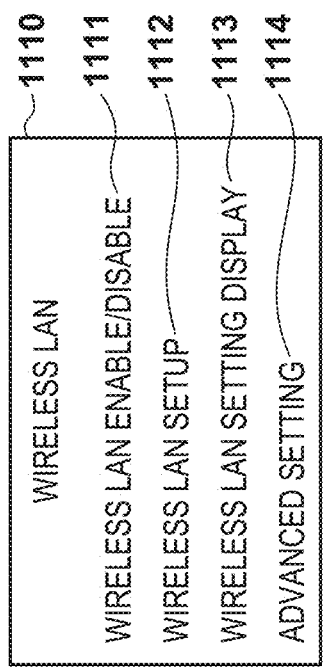

A screen 1140 shown in FIG. 11E is a screen which is displayed while "EAP router search" 1132 is selected in the screen 1130 in which the IEEE802.1X/EAP setting is enabled and a search for a wireless access point of the authentication method using the authentication server 500 is executed. The wireless access point search is processing of searching for access points existing around the MFP 300. The screen 1140 shown in FIG. 11E is also displayed while the "wireless LAN setup" 1112 is selected in the screen 1110 shown in FIG. 11B and a search for a wireless access point of the authentication method not using the authentication server 500 is executed.

Figure 11F:
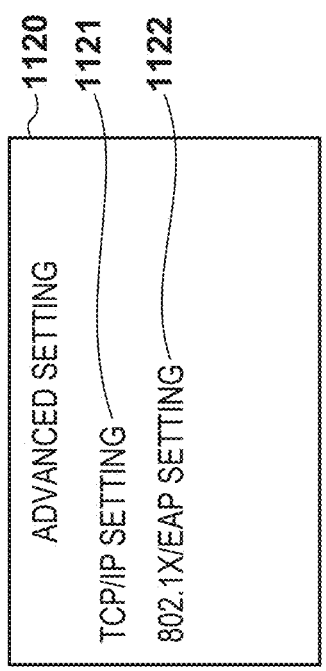

A screen 1150 shown in FIG. 11F is a screen for displaying a list of the identifiers (SSIDs: Service Set Identifiers) of wireless access points as a result of the wireless access point search. If the "EAP router search" 1132 is selected, an EAP router search is executed and only the SSIDs of wireless access points of the IEEE802. MEAP authentication method are displayed in the screen 1150 shown in FIG. 11F. Note that in this embodiment, the access point is, for example, a router, and thus a router search is a wireless access point search. If the "wireless LAN setup" 1112 is executed, only the SSIDs of wireless access points whose authentication method is not the IEEE802.1X/EAP authentication method are displayed. In the screen 1150 shown in FIG. 11F, SSIDWPA-EAP0001, WPA2-EAP005, and WPA3-EAP003 are displayed as SSIDs 1151 to 1153. These correspond to the WPA-EAP method, the WPA2-EAP method, and the WPA3-EAP method, respectively. Note that as another example of display, known methods such as the WPA-PSK method, the WPA2-PSK method, and the WPA3-SAE method may be displayed, and the OPEN method may additional additionally be displayed.

A screen 1160 shown in FIG. 11G is a screen which is displayed while one of SSIDs 1151, 1152, and 1153 of the wireless access points is selected in the screen 1150 shown in FIG. 11F and connection processing to the wireless access point is executed. A screen 1170 shown in FIG. 11H is a screen which is displayed when, after the screen 1160 shown in FIG. 11G is displayed, the attempt to execute connection to the access point is complete, and the connection succeeds or the connection proceeds to a predetermined stage.

A screen 1180 shown in FIG. 11I is a screen which is displayed when "IEEE802.1X/EAP enable/disable" 1131 is selected in the screen 1130 shown in FIG. 11D and in which the user can change enable/disable of the IEEE802.1X/EAP setting. In the screen 1180, enable 1181 and disable 1182 are displayed. In a state in which the IEEE802.1X/EAP setting is disabled, the MFP 300 executes no connection to the access point by IEEE802.1X/EAP. A screen 1190 shown in FIG. 11J is a screen which is displayed when the "EAP router search" 1132 is selected in the screen 1130 shown in FIG. 11D while the IEEE802.1X/EAP setting is disabled. That is, in this embodiment, if the IEEE802.1X/EAP setting is disabled, even if the "EAP router search" 1132 is selected, no router search is executed. A screen 1195 shown in FIG. 11K is a screen which is displayed when the "wireless direct" 1103 is selected in the screen 1100 shown in FIG. 11A while the IEEE802.1X/EAP setting is enabled. Thus, in this embodiment, if the wireless direct 1103 is selected while the IEEE802.1X/EAP setting is enabled, a message representing that connection in the wireless direct mode is not performed is displayed.

Note that control not to execute connection to the access point by the IEEE802.1X/EAP authentication, which is executed when the IEEE802.1X/EAP setting is disabled, is not limited to the above-described control. For example, the MFP 300 may execute a router search but need not display, in a list of access points found by the router search, an access point in which IEEE802.1X/EAP authentication is enabled. Alternatively, an access point in which IEEE802.1X/EAP authentication is enabled may also be displayed in the list but even if the user selects the access point, the MFP 300 need not execute connection processing to the access point in which IEEE802.1X/EAP authentication is enabled.

Figure 9:
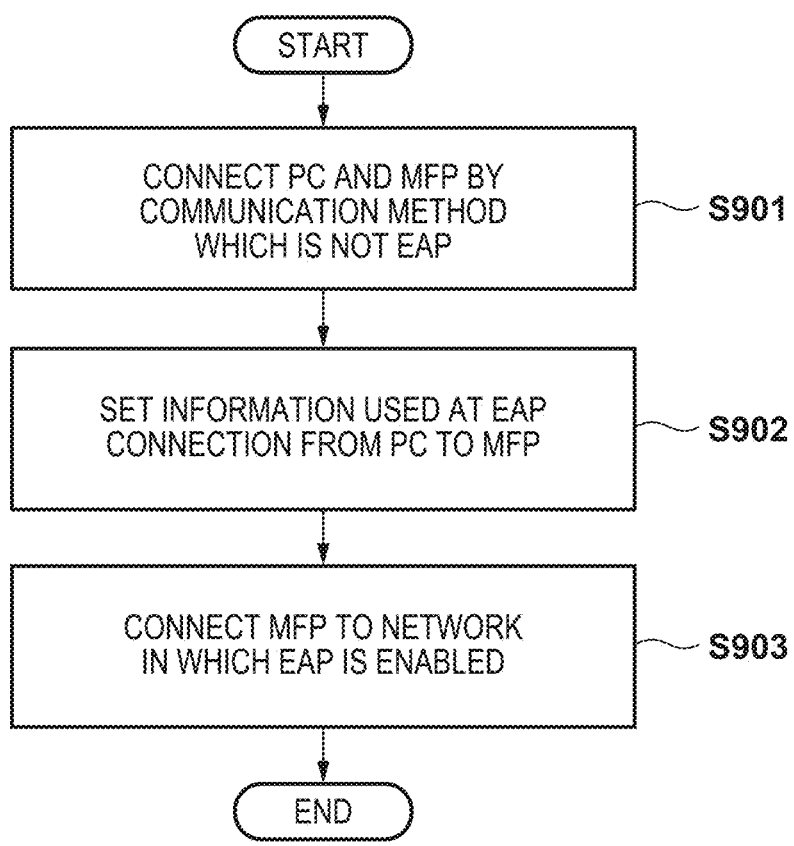
FIG. 9 is a flowchart illustrating an overview of processing of connecting the MFP to a network formed by the access point.

If the MFP 300 is connected to the network in which IEEE802.1X/EAP authentication is enabled, authentication needs to be performed after setting, in the MFP 300, information necessary for authentication. According to this embodiment, an overview of processing of connecting the MFP 300 to the network, formed by the access point 400, in which IEEE802.1X/EAP authentication is enabled will be described with reference to FIG. 9.

Figure 10A:
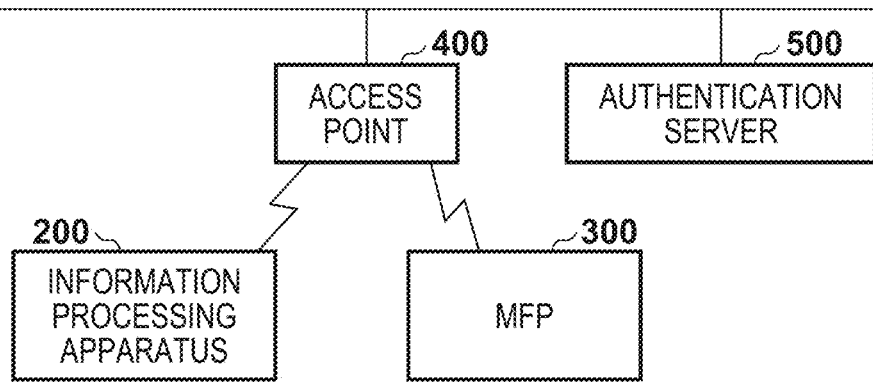
FIGS. 10A to 10C are views each for explaining a network among the apparatuses.
Figure 10B:
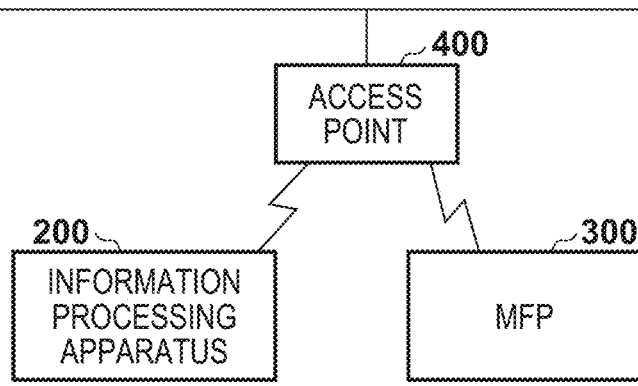
Figure 10C:
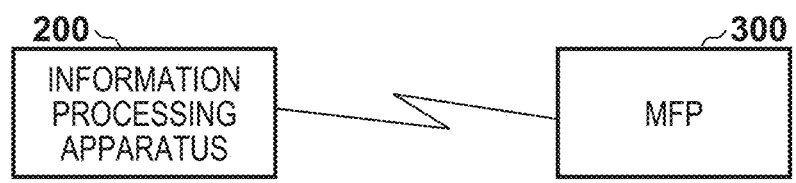

In step S901, the information processing apparatus 200 and the MFP 300 are connected to each other by a connection method in which IEEE802.1X/EAP authentication is not used. In step S901, the information processing apparatus 200 and the MFP 300 are connected to the network, formed by the access point 400, in which IEEE802.1X/EAP authentication is not used, as shown in FIG. 10B, and can communicate with each other via the access point 400. The network in which IEEE802.1X/EAP authentication is not used is, for example, a network of the authentication method not using the authentication server 500. Connection between the information processing apparatus 200 and the MFP 300 may be implemented by connecting the information processing apparatus 200 to a network formed by the MFP 300 operating as a master in the wireless direct mode, as shown in FIG. 10C. That is, more specifically, for example, in step S901, the MFP 300 accepts a connection request from the information processing apparatus 200 and establishes connection between the information processing apparatus 200 and the MFP 300 operating in the P2P mode.

In step S902, the information processing apparatus 200 transmits IEEE802.1X/EAP authentication information to the MFP 300, as will be described with reference to FIGS. 12A to 12G. Then, the MFP 300 executes setting concerning IEEE802.1X/EAP authentication using the information. In step S903, the MFP 300 is connected to the network, formed by the access point 400, in which IEEE802.1X/EAP authentication is enabled, as will be described with reference to FIG. 13. In other words, the MFP 300 establishes connection to the access point in which IEEE802.1X/EAP authentication is enabled. In step S903, the apparatuses are connected to the network (the network using the authentication server 500), formed by the access point 400, in which IEEE802.1X/EAP authentication is enabled, as shown in FIG. 10A, and can communicate with each other via the access point 400.

Figure 12A:
FIGS. 12A to 12G are views for explaining transition of a screen in the information processing apparatus.

FIGS. 12A to 12G are views for explaining transitions of a screen in the information processing apparatus 200. FIG. 12A shows an example of the setting screen of the MFP 300 displayed on the information processing apparatus 200. A screen 1200 shown in FIG. 12A is displayed when a Web browser or application program (to be referred to as an application hereinafter) operating on the information processing apparatus 200 communicates with an HTTP server operating on the MFP 300. In the screen 1200, for example, printer state 1201, main body setting 1202, LAN setting 1203, and security setting 1204 are displayed. Note that the screen 1200 shown in FIG. 12A may be displayed by performing standby response of an HTTP request in USB communication by the USB communication control unit 320 of the MFP 300.

Figure 12C:
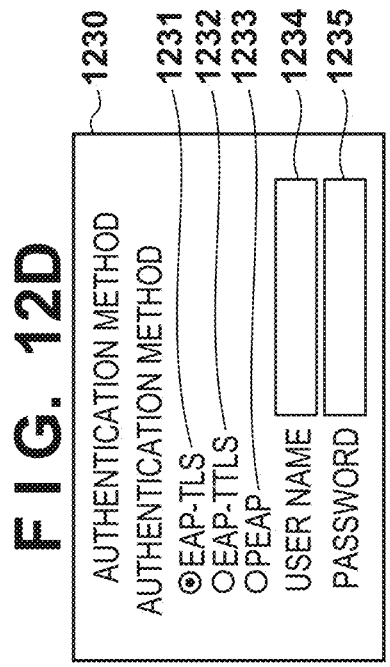
Figure 12B:
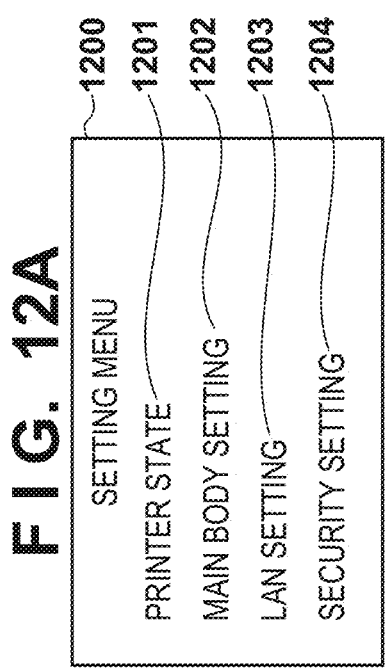

If the "security setting" 1204 is selected in the screen 1200 shown in FIG. 12A, a screen 1210 shown in FIG. 12B is displayed. In the screen 1210, for example, SSL/TLS setting 1211 and IEEE802.1X/EAP setting 1212 are displayed. If the "IEEE802.1X/EAP setting" 1212 is selected in the screen 1210 shown in FIG. 12B, a screen 1220 shown in FIG. 12C is displayed.

Figure 12D:
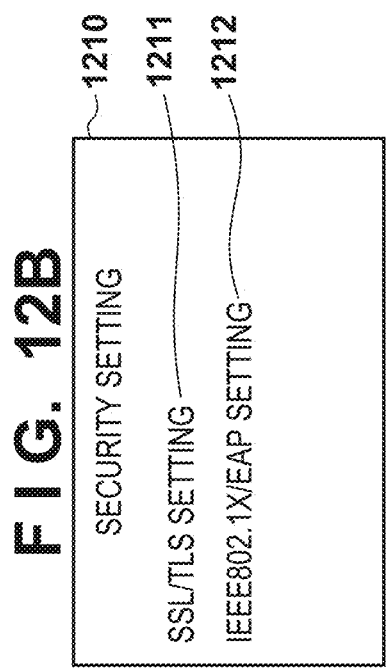

If "authentication method" 1221 is selected in the screen 1220 shown in FIG. 12C, a screen 1230 shown in FIG. 12D is displayed. When one of "EAP-TLS" 1231, "EAP-TTLS" 1232, and "PEAP" 1233 is selected in the screen 1230 shown in FIG. 12D, the authentication method to be used at the time of IEEE802.1X/EAP authentication is set in the MFP 300. If a user name is input to "user name" 1234 and a password is input to "password" 1235 in the screen 1230 shown in FIG. 12D, the user name and the password to be used at the time of IEEE802.1X/EAP authentication are set in the MFP 300.

Figure 12E:
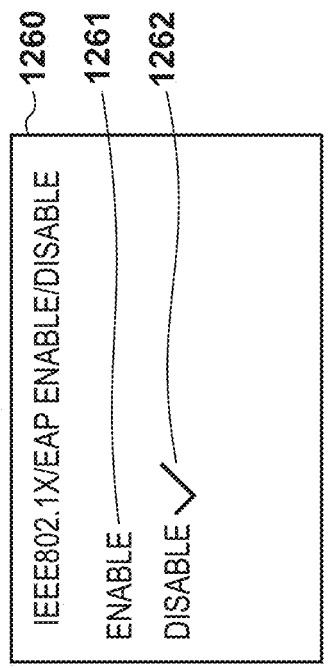
Figure 12F:
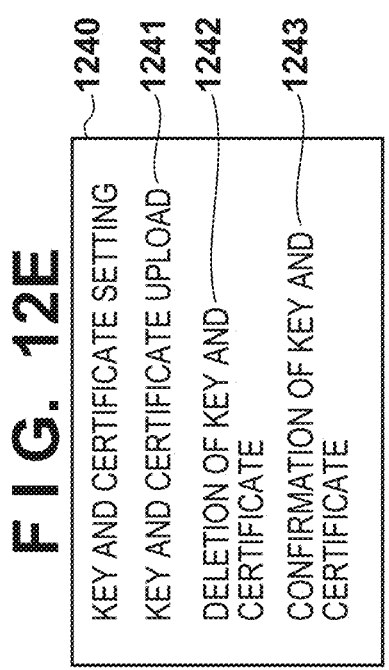

If the user selects "key and certificate setting" 1222 in the screen 1220 shown in FIG. 12C and selects "key and certificate upload" 1241 in a screen 1240 shown in FIG. 12E, a screen 1250 shown in FIG. 12F is displayed. In the screen 1250, the user can register, in the MFP 300, a certificate to be used at the time of IEEE802.1X/EAP authentication. If the user selects a file in "file selection" 1251 in the screen 1250 shown in FIG. 12F, a certificate to be used at the time of IEEE802.1X/EAP authentication is selected. Then, if the user inputs a password to "password" 1252 and selects "upload" 1253 in the screen 1250, the certificate and password to be used at the time of IEEE802.1X/EAP authentication are set in the MFP 300.

If the user selects "deletion of key and certificate" 1242 in the screen 1240 shown in FIG. 12E, it is possible to delete a certificate saved in the MFP 300. Alternatively, if the user selects "confirmation of key and certificate" 1243 in the screen 1240 shown in FIG. 12E, it is possible to display a list of certificates saved in the MFP 300.

Figure 12G:
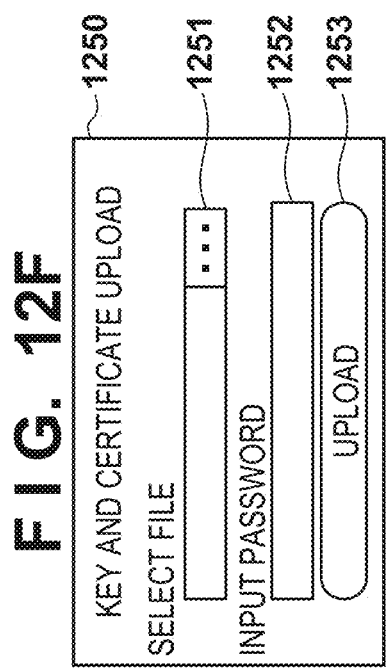

If the user selects "IEEE802.1X/EAP enable/disable" 1223 in the screen 1220 shown in FIG. 12C, a screen 1260 shown in FIG. 12G is displayed. In the screen 1260 shown in FIG. 12G, the user can enable or disable the IEEE802.1X/EAP setting of the MFP 300 by enable 1261 or disable 1262.

With the above user operation, the user can set, in the MFP 300, the authentication information to be used in IEEE802.1X/EAP authentication. When the authentication server 500 authenticates the MFP 300 using the set authentication information, the MFP 300 can be connected to the network that is formed by the access point 400 and uses the authentication server 500. Note that in this embodiment, each state of connection by each mode is managed as an enabled state (ON state)/disabled state (OFF state). For example, in the MFP 300, effective connection switching or communication control can be performed by controlling the wireless communication unit 307 or the wired communication unit 321.

FIG. 13 is a flowchart illustrating setup processing of connecting the MFP 300 to the network that is formed by the access point 400 and uses the authentication server 500. Note that before execution of the setup processing shown in FIG. 13, authentication information to be used for IEEE802.1X/EAP authentication needs to be set in the MFP 300 in step S902 of FIG. 9. If no authentication information is set in the MFP 300, EAP authentication fails. The processing shown in FIG. 13 is implemented when, for example, the CPU 311 reads out programs stored in the program memory 313 and executes them.

In step S1301, the CPU 311 of the MFP 300 receives an access point search request. For example, when the user performs an operation of selecting the "EAP router search" 1132 in the screen 1130 shown in FIG. 11D, the CPU 311 receives an access point search request.

In step S1302, the CPU 311 determines whether the type of the access point search request is "EAP". In other words, in step S1302, it is determined whether the request is a request to search for an access point of the authentication method using the authentication server 500. For example, if the user selects the "EAP router search" 1132 in the screen 1130 shown in FIG. 11D, the type of the access point search request is determined to be "EAP". Also, the determination processing in step S1302 may be performed based on whether the search request received by the MFP 300 via the communication path includes an instruction to search for an access point of the authentication method using the authentication server 500. On the other hand, if the user selects the "wireless LAN setup" 1112 in the screen 1110 shown in FIG. 11B, the CPU 311 determines that the type of the access point search request is not "EAP". If it is determined in step S1302 that the type of the access point search request is "EAP", the process advances to step S1303. On the other hand, if it is determined that the type of the access point search request is not "EAP", the process advances to step S1307.

In step S1303, the CPU 311 determines whether the IEEE802.1X/EAP setting is enabled. The determination processing in step S1303 is performed based on, for example, setting contents of the "IEEE802.1X/EAP enable/disable" 1131 in the screen 1130 shown in FIG. 11D. If it is determined in step S1303 that the IEEE802.1X/EAP setting is enabled, the process advances to step S1305; otherwise, the process advances to step S1304.

In step S1304, the CPU 311 returns a response that the search for the access point of the authentication method using the authentication server 500 cannot be executed, and then ends the processing shown in FIG. 13. For example, if the "EAP router search" 1132 is selected in the screen 1130 shown in FIG. 11D while the IEEE802.1X/EAP setting is disabled, a screen like the screen 1190 shown in FIG. 11J is displayed in step S1304.

The CPU 311 searches, in step S1305, for an access point of the authentication method using the authentication server 500, and stores, in step S1306, information indicating that the search for the access point of the authentication method using the authentication server 500 has been executed. Note that steps S1305 and S1306 may be performed in a reverse order.

If it is determined in step S1302 that the type of the access point search request is not "EAP", the CPU 311 searches, in step S1307, for an access point of an authentication method other than the authentication method using the authentication server 500. In step S1308, the CPU 311 stores information indicating that the search for the access point of the authentication method other than the authentication method using the authentication server 500 has been executed. Note that steps S1307 and S1308 may be performed in a reverse order. After steps S1306 and S1308, the process advances to step S1309.

In step S1309, the CPU 311 displays, as a result of the access point search, a list of the SSIDs of the wireless access points, as shown in the screen 1150 of FIG. 11F. In step S1310, the CPU 311 accepts a user selection of the SSID of the access point to be connected.

In step S1311, the CPU 311 determines whether the wireless direct mode is enabled. In this embodiment, since the enabled state (ON state)/disabled state (OFF state) of each communication mode is stored as setting information in the MFP 300, the determination processing in step S1311 is performed based on, for example, the stored information of each communication mode. If it is determined that the wireless direct mode is enabled, the process advances to step S1312; otherwise, the process advances to step S1316.

In step S1312, the CPU 311 determines whether the IEEE802.1X/EAP setting is enabled. The determination processing in step S1312 is performed based on, for example, setting contents of the "IEEE802.1X/EAP enable/disable" 1131 in the screen 1130 shown in FIG. 11D. If it is determined that the IEEE802.1X/EAP setting is enabled, the process advances to step S1313; otherwise, the process advances to step S1316.

In step S1313, the CPU 311 determines whether the access point to be connected is the access point of the authentication method using the authentication server 500. If it is determined that the access point to be connected is the access point of the authentication method using the authentication server 500, the process advances to step S1314; otherwise, the process advances to step S1316. The determination processing in step S1313 is performed based on, for example, contents stored in step S1306 or S1308.

In step S1314, the CPU 311 disables the wireless direct mode. Then, in step S1315, the CPU 311 enables the wireless infrastructure mode to execute, using the authentication information set in step S902, connection to the network, formed by the access point 400, of the authentication method using the authentication server 500. Note that, more specifically, disabling of the wireless direct mode is to set, for example, a state in which the MFP 300 establishes no Wi-Fi direct connection to another apparatus by stopping an operation as an access point or stopping an operation as a Wi-Fi Direct group owner.

In step S1311 and the subsequent steps, if the wireless direct mode is enabled, the IEEE802.1X/EAP setting is enabled, and the authentication method of the access point to be connected is the authentication method using the authentication server 500, the wireless direct mode is disabled and the wireless infrastructure mode is enabled. If the wireless infrastructure mode is enabled, the MFP 300 is connected to the access point 400 using the authentication information set from the information processing apparatus 200. Note that enabling of the wireless infrastructure mode is to start the operation in the wireless infrastructure mode.

If it is determined that any one of the conditions in steps S1311, S1312, and S1313 is not satisfied, the CPU 311 enables, in step S1316, the wireless infrastructure mode to connect the MFP 300 to the access point 400. In this case, connection in the wireless infrastructure mode is connection that is established without using the IEEE802.1X/EAP authentication method. If it is determined in step S1312 that the condition is not satisfied or it is determined in step S1313 that the condition is not satisfied, both the wireless direct mode and the wireless infrastructure mode in which the IEEE802.1X/EAP authentication method is not used are enabled. Note that if the process advances to step S1315 after the SSID of the access point is selected in step S1310, the screen 1160 shown in FIG. 11G is displayed until an attempt to execute connection to the access point in step S1315 is started. If the process advances to step S1316, the screen 1160 shown in FIG. 11G is displayed until the success or failure of connection to the access point is confirmed in step S1316.

As described above, it is possible to connect the MFP 300 to the network, formed by the access point 400, of the authentication method using the authentication server 500. At this time, if the wireless direct mode is enabled, the wireless direct mode is disabled, and after that, the MFP 300 is connected to the network of the authentication method using the authentication server 500.

Note that in step S1302, the type of the search request for the access point 400 may not be designated. For example, priority may be placed on the search request for the access point of the authentication method using the authentication server 500, or access point connection may be attempted regardless of type.

In FIG. 13, if connection to an access point of the authentication method using the authentication server 500 is requested, and the wireless direct mode is enabled, the wireless direct mode is disabled, and the wireless infrastructure mode is then enabled, as described above.

A case in which the wireless direct mode is enabled is, for example, a case in which the "wireless direct" 1103 is selected in the screen 1100 shown in FIG. 11A. Alternatively, the case is, for example, a case in which an instruction to enable the wireless direct mode is received during communication with the information processing apparatus 200 connected in the wireless infrastructure mode. In this embodiment, if a request to enable the wireless direct mode is accepted, as in the above-described case, and the MFP 300 is operating in the wireless infrastructure mode of the authentication method using the authentication server 500, the request to enable the wireless direct mode is rejected. This operation will be described below with reference to FIG. 14.

Figure 14:
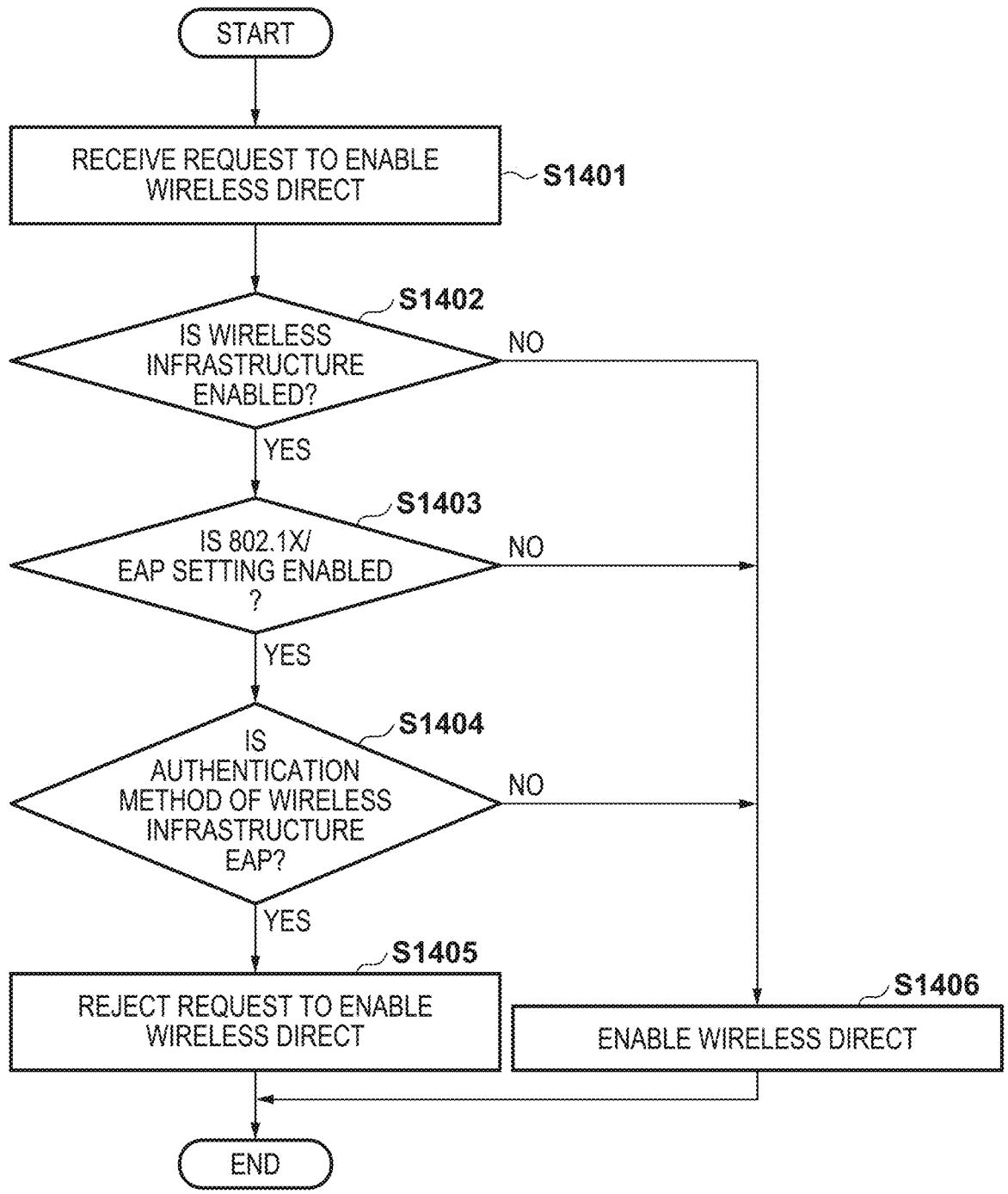
FIG. 14 is a flowchart illustrating processing in a case in which a request to enable a wireless direct mode is received.

FIG. 14 is a flowchart illustrating the operation of the MFP 300 in a case in which a request to enable the wireless direct mode is received. Processing shown in FIG. 14 is implemented when, for example, the CPU 311 reads out programs stored in the program memory 313 and executes them.

In step S1401, the CPU 311 receives a request to enable the wireless direct mode. The request to enable the wireless direct mode is an instruction to start an operation in the wireless direct mode. Note that the start instruction is issued by, for example, the user performing the operation of selecting the "wireless direct" 1103 in the screen 1100 shown in FIG. 11A. In addition, the start instruction is transmitted to the MFP 300 in communication with the information processing apparatus 200. Note that the operation of selecting the "wireless direct" 1103 is an operation of enabling the wireless direct mode. Reception of the start instruction from the information processing apparatus 200 may be done, for example, via the access point to which the MFP 300 is connected in the wireless infrastructure mode. Alternatively, reception of the start instruction from the information processing apparatus 200 may be done, for example, via communication, with the information processing apparatus 200, complying with a communication standard other than the IEEE802.11 standard series. The communication standard other than the IEEE802.11 standard series is, for example, Bluetooth Classic, Bluetooth Low Energy (BLE), or Near Field Communication (NFC).

In step S1402, the CPU 311 determines whether the wireless infrastructure mode is enabled. In this embodiment, since the enabled state (ON state)/disabled state (OFF state) of each communication mode is stored as setting information in the MFP 300, the determination processing in step S1402 is performed based on, for example, the stored information of each communication mode. If it is determined that the wireless infrastructure mode is enabled, the process advances to step S1403; otherwise, the process advances to step S1406.

In step S1403, the CPU 311 determines whether the IEEE802.1X/EAP setting is enabled. The determination processing in step S1403 is performed based on, for example, setting contents of the "IEEE802.1X/EAP enable/disable" 1131 in the screen 1130 shown in FIG. 11D. If it is determined that the IEEE802.1X/EAP setting is enabled, the process advances to step S1404; otherwise, the process advances to step S1406.

In step S1404, the CPU 311 determines whether the authentication method used by the access point to which the MFP 300 is connected is the authentication method using the authentication server 500. In other words, the CPU 311 determines whether the MFP 300 is connected to an access point connected by the authentication method using the authentication server 500. The determination processing in step S1404 is performed based on, for example, contents stored in step S1306 or S1308 of FIG. 13. If it is determined that the authentication method is the authentication method using the authentication server 500, the process advances to step S1405; otherwise, the process advances to step S1406.

That the process advances to step S1405 means that the request to enable the wireless direct mode is received in a state in which the MFP 300 is operating by the authentication method using the authentication server 500 on the connection side in the wireless infrastructure mode. In this embodiment, in this case, the CPU 311 rejects the request to enable the wireless direct mode (that is, controls such that an operation in the wireless direct mode is not performed). The CPU 311 thus controls such that connection in the wireless direct mode and connection in the wireless infrastructure mode by the IEEE802.1X/EAP setting are not simultaneously established. At this time, the screen 1195 shown in FIG. 11K is displayed on the operation display unit 302.

On the other hand, in step S1406, the CPU 311 enables the wireless direct mode. If it is determined in step S1402 that the wireless infrastructure mode is not enabled, and the process advances to step S1406, only the wireless direct mode is enabled. If the process advances from one of steps S1403 and S1404 to step S1406, both the wireless infrastructure mode (not by the authentication method using the authentication server 500) and the wireless direct mode are enabled. If the process proceeds through steps S1402, S1403, S1404, and S1405, only the wireless infrastructure mode (by the authentication method using the authentication server 500) is enabled.

Figure 15:
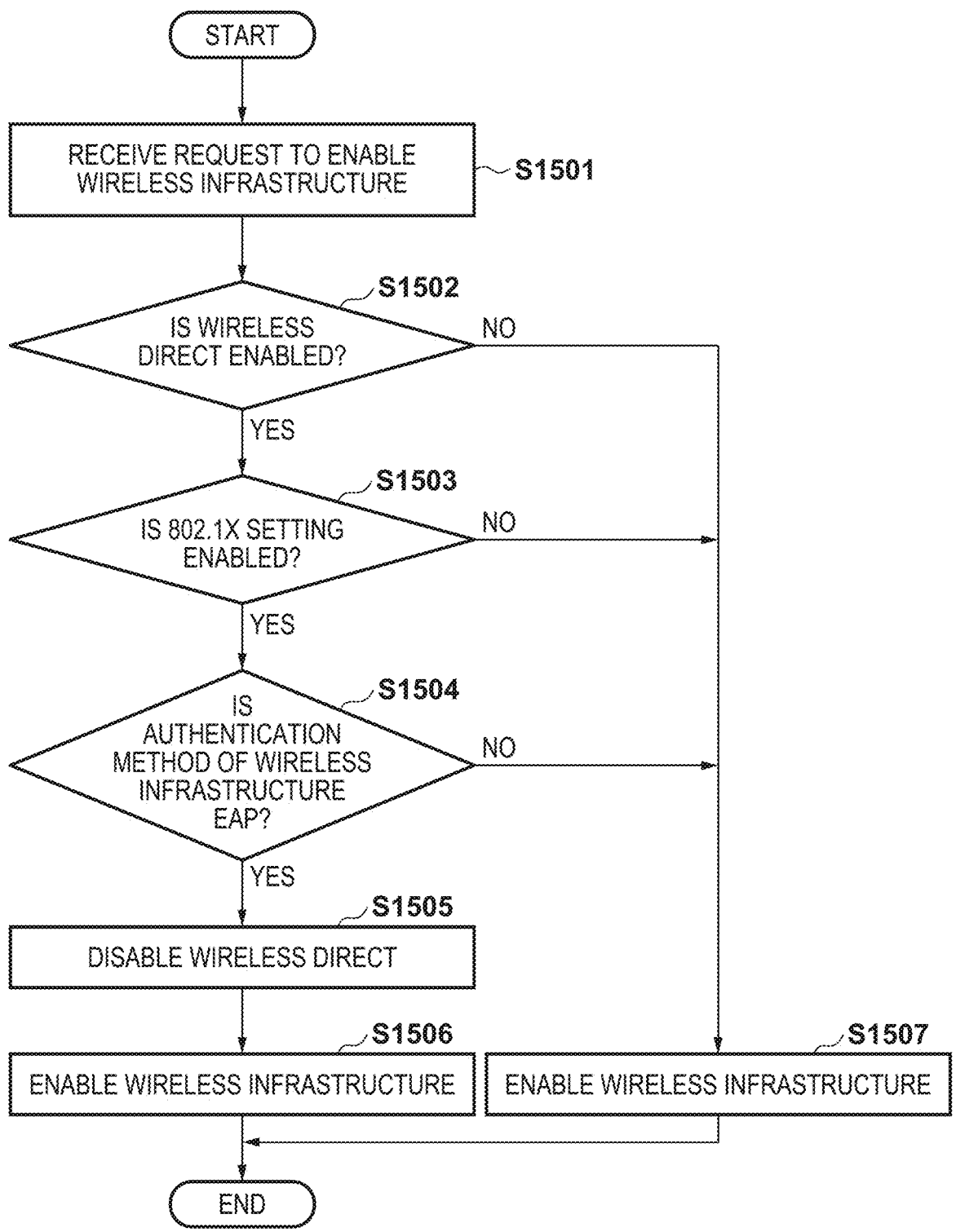
FIG. 15 is a flowchart illustrating processing in a case in which a request to enable a wireless infrastructure mode is received.

FIG. 15 is a flowchart illustrating the operation of the MFP 300 in a case in which a request to enable the wireless infrastructure mode is received. Processing shown in FIG. 15 is implemented when, for example, the CPU 311 reads out programs stored in the program memory 313 and executes them.

In step S1501, the CPU 311 receives a request to enable the wireless infrastructure mode. For example, if "enable" is set by the "IEEE802.1X/EAP enable/disable" 1131 in the screen 1130 shown in FIG. 11D, the request to enable the wireless infrastructure mode is received, and the process advances to step S1502. In steps S1502 to S1507, the same processing as in steps S1311 to S1316 of FIG. 13 is performed. That is, if the wireless infrastructure mode is requested to be enabled, and the wireless direct mode is enabled, the wireless direct mode is disabled, and the wireless infrastructure mode is then enabled.

As described above, according to this embodiment, if the MFP 300 is operating in the wireless infrastructure mode in which the authentication method using the authentication server 500 is used, the MFP 300 is not simultaneously operated in the wireless direct mode. With this arrangement, connection is never performed in the wireless direct mode without authentication when the MFP 300 is operating in the wireless infrastructure mode in which the authentication method using the authentication server 500 is used, and it is possible to prevent a difference from occurring in the authentication level between the modes.

Note that a form in which the determinations in steps S1403 and S1404 are performed as the determination for controlling not to simultaneously establish connection in the wireless direct mode and connection in the wireless infrastructure mode by the IEEE802.1X/EAP setting has been described above. However, the present invention is not limited to this form, and only one of the determinations in steps S1403 and S1404 may be performed. If NO in one of the determinations, the process may advance to step S1406. If YES, the process may advance to step S1405.

Also, as the processing for controlling not to simultaneously establish connection in the wireless direct mode and connection in the wireless infrastructure mode by the IEEE802.1X/EAP setting, processing of not activating the wireless direct mode even upon accepting a start instruction is executed above. However, the present invention is not limited to this processing. For example, in a state in which connection in the wireless infrastructure mode by the IEEE802.1X/EAP setting is established, control of graying out a button (more specifically, for example, the "wireless direct" 1103) used to perform the operation for the start instruction of the wireless direct mode or inhibiting display of the button may be executed. Accordingly, the operation for the start instruction of the wireless direct mode cannot be accepted, and control can be performed not to establish connection in the wireless direct mode.

Second Embodiment

The second embodiment will be described below concerning differences from the first embodiment. In the first embodiment, the configuration for inhibiting connection in the wireless direct mode during the operation of the MFP 300 in the wireless infrastructure mode of the authentication method using the authentication server 500 has been described. In the second embodiment, in connection in the wireless direct mode, only communication with an authenticated information processing apparatus 200 is executed. A connection state in the wireless direct mode in which only communication in which authentication is executed is performed will be referred to as an "authentication limited state", and a connection state in the wireless direct mode without such limitation will be referred to as a "normal state" hereinafter.

An MFP 300 can perform a wireless simultaneous operation, as described in the first embodiment. Depending on the authentication setting, connection in the wireless direct mode can be executed without performing authentication. If access management is performed by an authentication server 500 in the wireless infrastructure mode, a deviation occurs in the authentication level to access the MFP 300. In this embodiment, in a state in which the MFP 300 is operating in the wireless infrastructure mode of the authentication method using the authentication server 500, connection in the wireless direct mode is set to the authentication limited state, thereby executing only communication with the authenticated information processing apparatus 200. As a result, it is possible to prevent a deviation from occurring in the authentication level to access the MFP 300.

Figure 16:
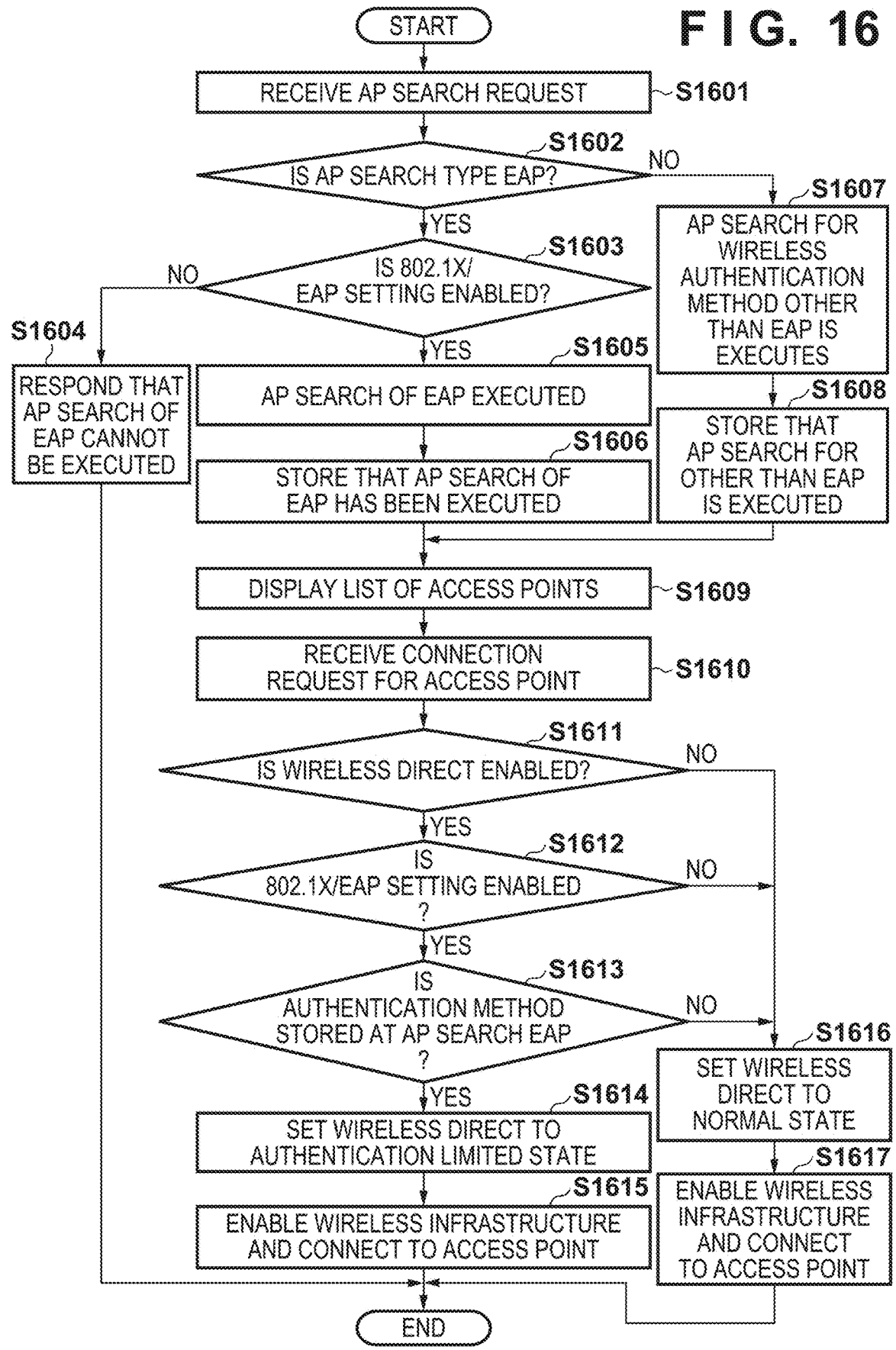
FIG. 16 is a flowchart illustrating processing of connecting an MFP to a network formed by an access point.

FIG. 16 is a flowchart illustrating setup processing of connecting the MFP 300 to a network that is formed by an access point 400 and uses the authentication server 500. Note that before execution of the setup processing shown in FIG. 16, authentication information to be used for IEEE802.1X/EAP authentication needs to be set in the MFP 300 in step S902 of FIG. 9. If no authentication information is set in the MFP 300, EAP authentication fails. The processing shown in FIG. 16 is implemented when, for example, a CPU 311 reads out programs stored in a program memory 313 and executes them.

Steps S1601 to S1613 of FIG. 16 are the same as steps S1301 to S1313 of FIG. 13, and a description thereof will be omitted.

If it is determined in step S1613 that the access point to be connected is the access point of the authentication method using the authentication server 500, the process advances to step S1614. In step S1614, the CPU 311 sets connection in the wireless direct mode to the authentication limited state and advances to step S1615. The operation of setting the authentication limited state will be described later with reference to FIGS. 19 to 21.

In step S1615, the CPU 311 enables the wireless infrastructure mode, and connects the MFP 300 to the network of the authentication method using the authentication server 500, which is formed by the access point 400, using the authentication information set in step S902. Hence, in a case in which the MFP 300 is connected to the network in which IEEE802.1X/EAP authentication is enabled, even if the MFP 300 simultaneously operates in the wireless direct mode, only communication with the authenticated information processing apparatus 200 is performed on the connection side in the wireless direct mode. After step S1615, the processing shown in FIG. 16 is ended.

On the other hand, if the process advances from one of steps S1611, S1612, and S1613 to step S1616, the CPU 311 sets connection in the wireless direct mode to the normal state, and advances to step S1617. In step S1617, the CPU 311 enables the wireless infrastructure mode, and connects the MFP 300 to the network formed by the access point 400. Here, since connection in the wireless direct mode is in the normal state, communication without authentication can be executed.

Thus, the MFP 300 can be connected to the wireless infrastructure network of the authentication method using the authentication server 500, which is formed by the access point 400. At this time, if the wireless direct mode is enabled, the wireless direct mode is set to the authentication limited state, and the MFP 300 is then connected to the network of the authentication method using the authentication server 500.

In FIG. 16, if connection to the access point of the authentication method using the authentication server 500 is requested, and the wireless direct mode is enabled, the wireless direct mode is set to the authentication limited state, and the wireless infrastructure mode is then enabled, as described above.

A case in which the wireless direct mode is enabled is, for example, a case in which "wireless direct" 1103 is selected in a screen 1100 shown in FIG. 11A. Alternatively, the case is, for example, a case in which an instruction to enable the wireless direct mode is received during communication with the information processing apparatus 200 connected in the wireless infrastructure mode. In this embodiment, if a request to enable the wireless direct mode is accepted, as in the above-described case, and the MFP 300 is operating in the wireless infrastructure mode of the authentication method using the authentication server 500, the wireless direct mode is set to the authentication limited state and enabled. The processing will be described below with reference to FIG. 17.

Figure 17:
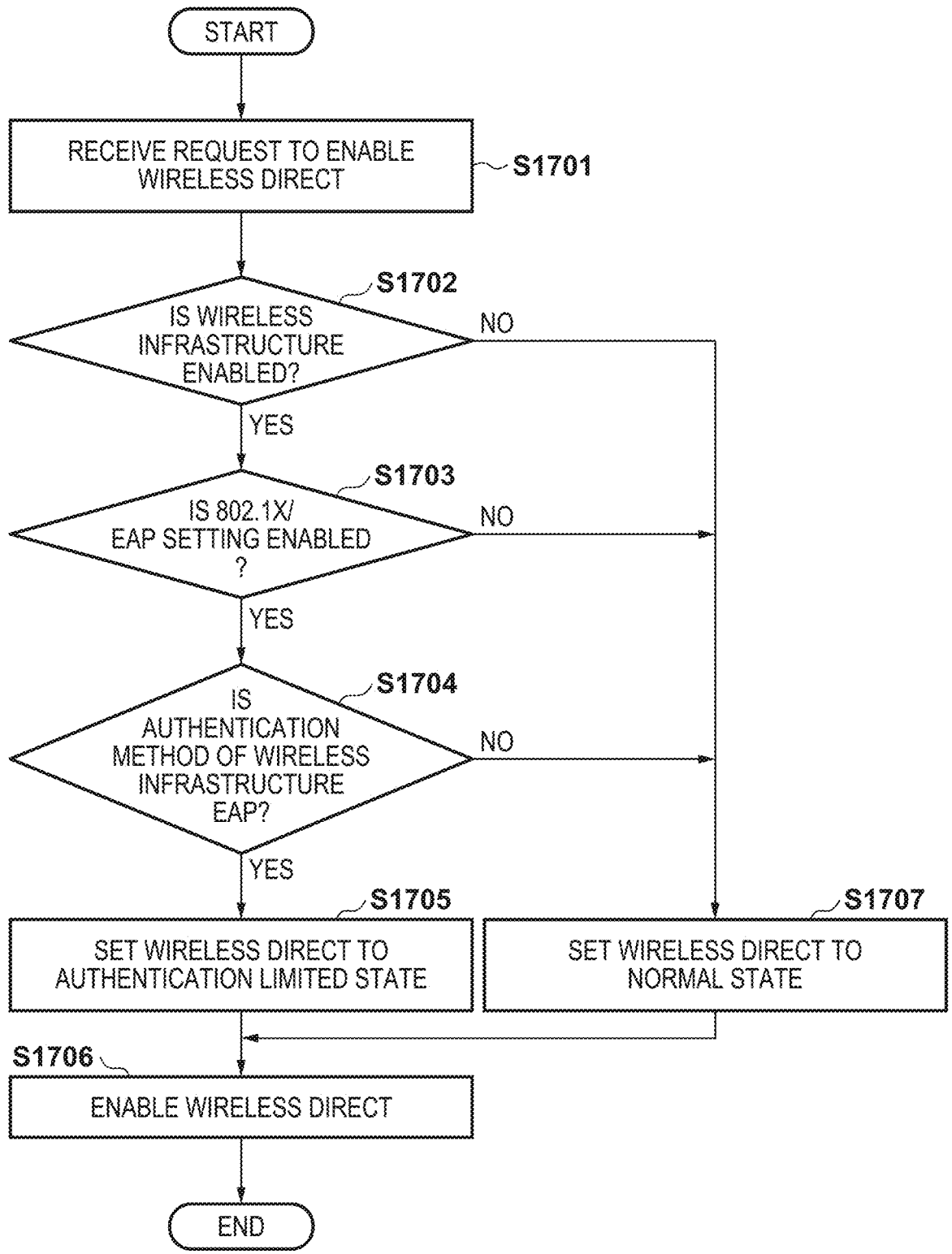
FIG. 17 is a flowchart illustrating processing in a case in which a request to enable a wireless direct mode is received.

FIG. 17 is a flowchart illustrating the operation of the MFP 300 in a case in which a request to enable the wireless direct mode is received. Processing shown in FIG. 17 is implemented when, for example, the CPU 311 reads out programs stored in the program memory 313 and executes them.

Steps S1701 to S1704 of FIG. 17 are the same as steps S1401 to S1404 of FIG. 14, and a description thereof will be omitted.

If it is determined that the authentication method of the access point of the connection target is the authentication method using the authentication server 500, in step S1705, the CPU 311 sets connection in the wireless direct mode to the authentication limited state. After that, in step S1706, the CPU 311 enables the wireless direct mode. On the other hand, it NO in one of steps S1702 to S1704, in step S1707, the CPU 311 sets connection in the wireless direct mode to the normal state. After that, in step S1706, the CPU 311 enables the wireless direct mode.

As described above, in this embodiment, if a request to enable the wireless direct mode is accepted, and the MFP 300 is operating in the wireless infrastructure mode of the authentication method using the authentication server 500, the wireless direct mode is set to the authentication limited state and enabled.

Figure 18:
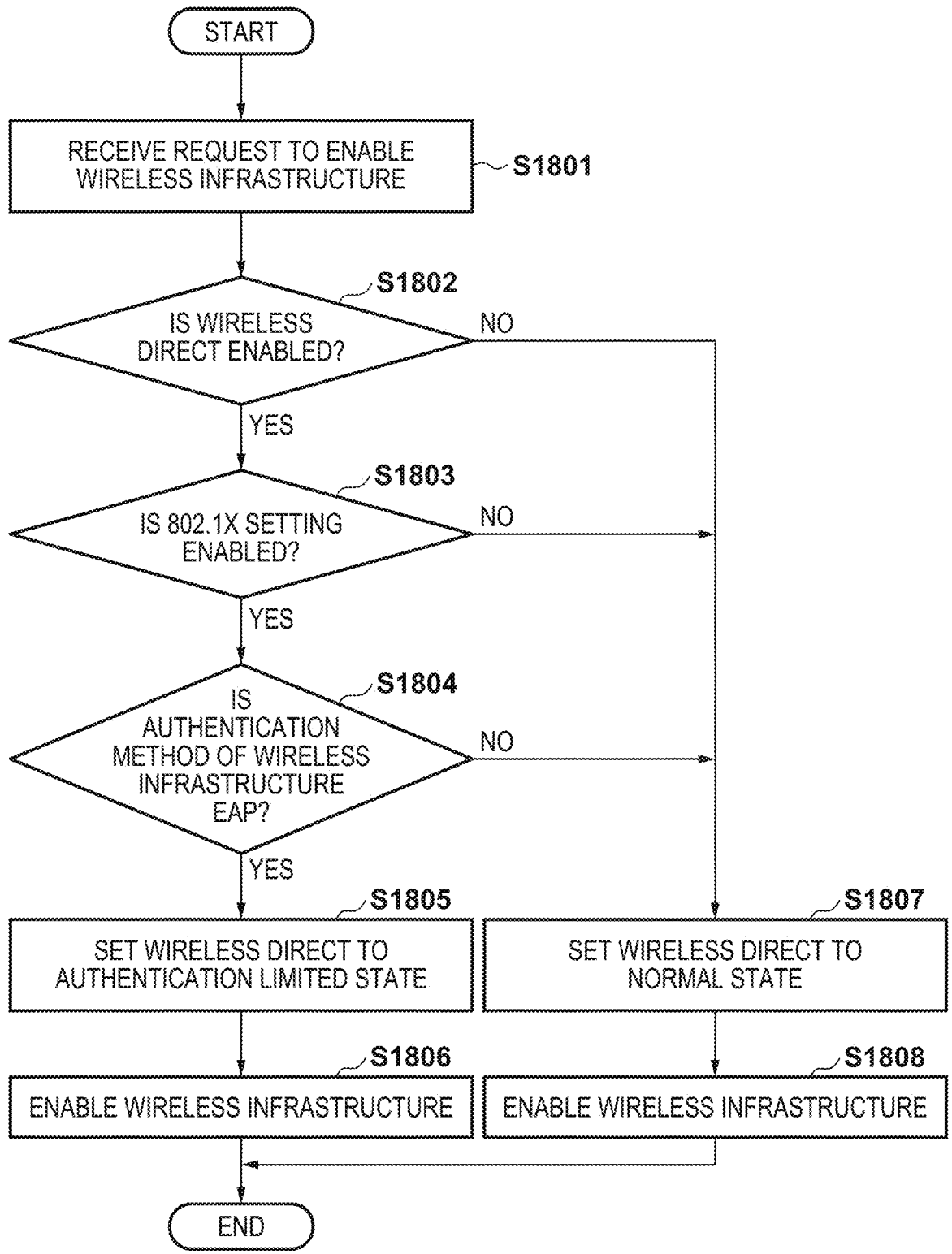
FIG. 18 is a flowchart illustrating processing in a case in which a request to enable a wireless infrastructure mode is received.

FIG. 18 is a flowchart illustrating the operation of the MFP 300 in a case in which a request to enable the wireless infrastructure mode is received. Processing shown in FIG. 18 is implemented when, for example, the CPU 311 reads out programs stored in the program memory 313 and executes them.

A case in which the wireless infrastructure mode is enabled is, for example, a case in which "enable" is set by "IEEE802.1X/EAP enable/disable" 1131 in a screen 1130 shown in FIG. 11D.

In step S1801, the CPU 311 receives a request to enable the wireless infrastructure mode. For example, if the "IEEE802.1X/EAP enable/disable" 1131 in the screen 1130 shown in FIG. 11D and enable 1181 in a screen 1180 shown in FIG. 11I are set, the request to enable the wireless infrastructure mode is received, and the process advances to step S1802. In steps S1802 to S1808, the same processing as in steps S1611 to S1617 of FIG. 16 is performed. That is, if the wireless infrastructure mode is requested to be enabled, and the wireless direct mode is enabled, the wireless direct mode is set to the authentication limited state, and the wireless infrastructure mode is then enabled.

Figure 19:
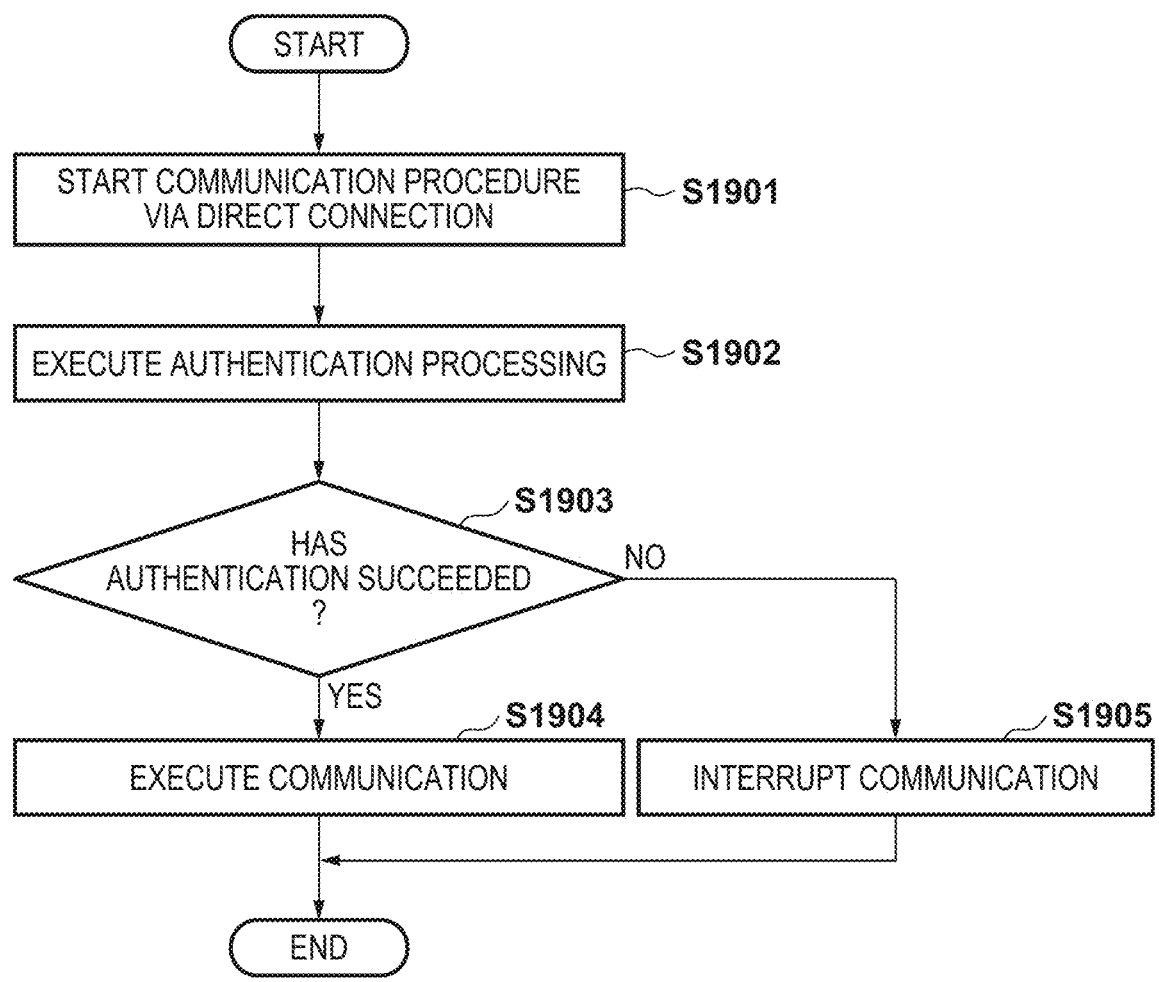
FIG. 19 is a flowchart illustrating processing in the MFP.
Figure 20:
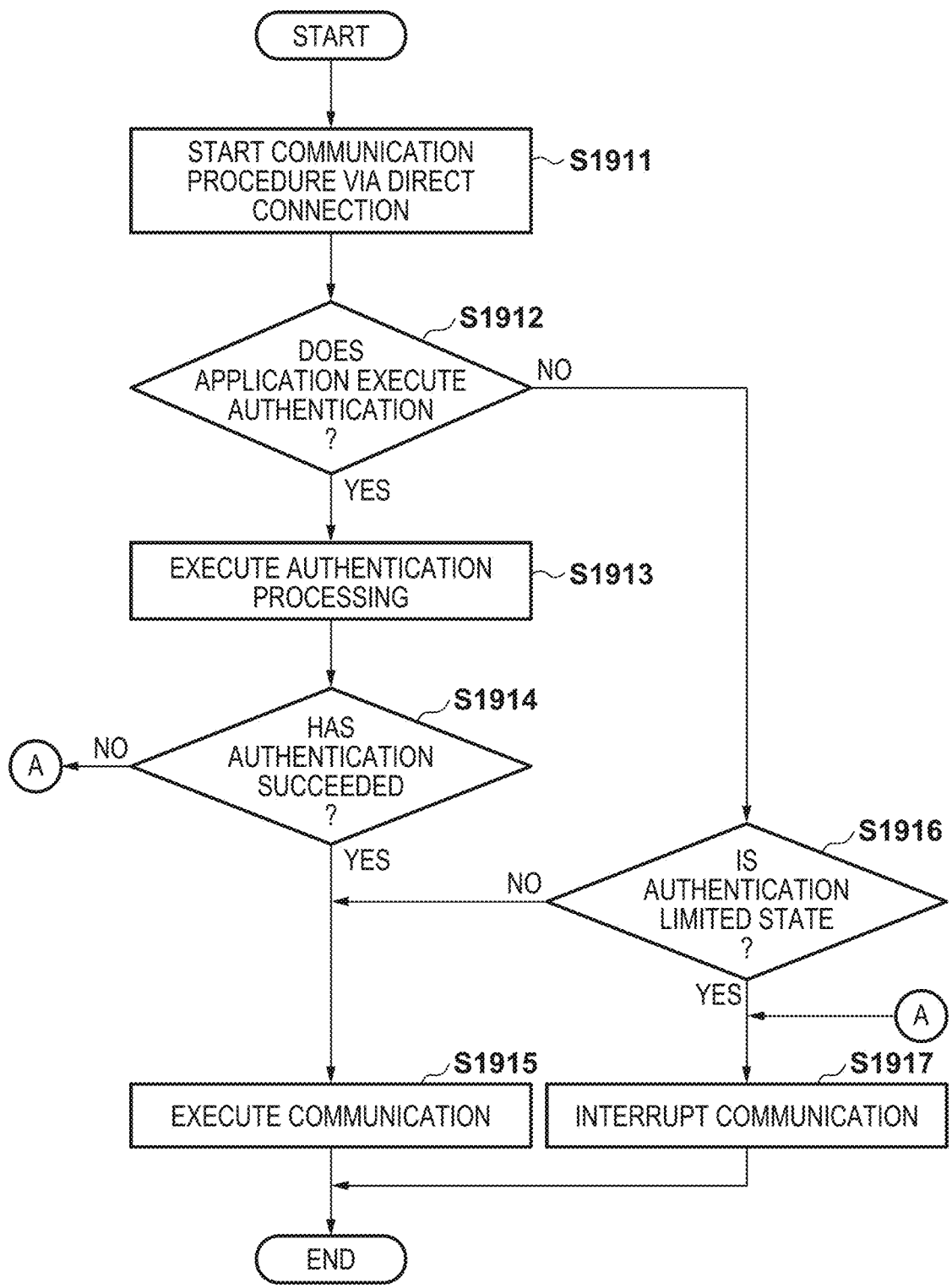
FIG. 20 is a flowchart illustrating processing in the MFP.
Figure 21:
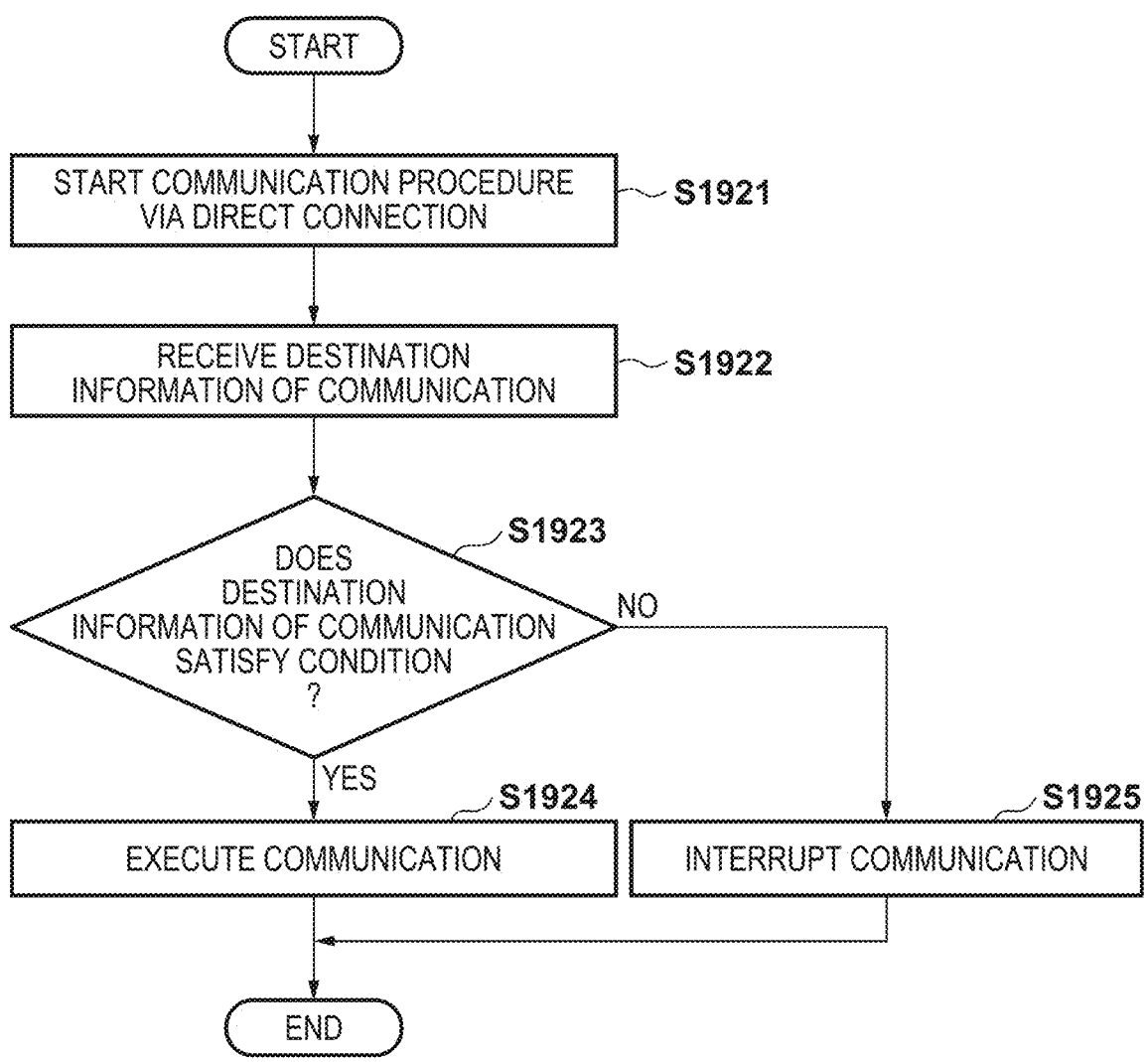
FIG. 21 is a flowchart illustrating processing in the MFP.

The operation of setting the authentication limited state will be described below. In a case in which the MFP 300 is connected in the wireless infrastructure mode to a network in which IEEE802.1X/EAP authentication is enabled, to match the authentication levels, control is performed to execute only communication with an authentication operation even in connection in the wireless direct mode that simultaneously operates. In this embodiment, the state at this time in which only communication with the authentication operation is executed is called an authentication limited state. A method of implementing the authentication limited state will be described with reference to FIGS. 19 to 21. In this embodiment, the processing of implementing the authentication limited state will be described with reference to three flowcharts. However, the flowcharts are not limited to the flowcharts shown in FIGS. 19 to 21 if the same effect as each process can be implemented. Note that the processes shown in FIGS. 19 to 21 are executed when starting the communication procedure by connection in the wireless direct mode between the information processing apparatus 200 and the MFP 300. The communication procedure between the information processing apparatus 200 and the MFP 300 includes, for example, the communication procedure of an application level using the functions of the MFP 300.

FIG. 19 is a flowchart illustrating processing in the MFP 300, which is performed when starting the communication procedure by connection in the wireless direct mode. In the processing shown in FIG. 19, when starting the communication procedure between the MFP 300 and the information processing apparatus 200, the MFP 300 executes processing of authenticating the information processing apparatus 200. Processing shown in FIG. 19 is implemented when, for example, the CPU 311 reads out programs stored in the program memory 313 and executes them.

In step S1901, the CPU 311 starts the communication procedure with the information processing apparatus 200 by connection in the wireless direct mode. The communication procedure here is the above-described communication procedure. In step S1902, the CPU 311 executes authentication of the information processing apparatus 200 because connection in the wireless direct mode is in the authentication limited state. The authentication here may be done by sending an ID and password assigned to the information processing apparatus 200 from the information processing apparatus 200 to the MFP 300 and confirming these by the MFP 300. Note that the authentication may be performed using not the ID and password but a challenge-and-response method, a client certificate, or a token. In step S1903, the CPU 311 determines whether the authentication succeeds. If it is determined that the authentication succeeds, the process advances to step S1904; otherwise, the process advances to step S1905. Note that in step S1903, for example, if the authentication information (an ID and a password) of the information processing apparatus 200 permitted to access the MFP 300 is confirmed by IEEE802.1X/EAP authentication, it is determined that the authentication succeeds.

If the authentication succeeds, in step S1904, the CPU 311 continuously executes the communication procedure with the information processing apparatus 200. For example, based on information received from the information processing apparatus 200 via the communication procedure, the CPU 311 can execute printing of image data, scan of an image, change of settings, and the like. On the other hand, if the authentication fails, in step S1905, the CPU 311 interrupts the communication procedure with the information processing apparatus 200.

As described above, if connection in the wireless direct mode is in the authentication limited state, it is determined, based on the authentication information uniquely assigned to the information processing apparatus 200, whether to continue the communication procedure with the information processing apparatus 200. As a result, only the communication procedure with the information processing apparatus 200 that has succeeded in authentication is executed, and communication other than the communication of the communication procedure is restricted. It is therefore possible to prevent communication in the wireless direct mode from being continuously performed without performing authentication.

FIG. 20 is a flowchart illustrating processing in the MFP 300, which is performed when starting the communication procedure by connection in the wireless direct mode. In the processing shown in FIG. 20, processing of authenticating the information processing apparatus 200 is executed based on the presence/absence of authentication in the communication procedure and whether connection in the wireless direct mode is in the authentication limited state. Processing shown in FIG. 20 is implemented when, for example, the CPU 311 reads out programs stored in the program memory 313 and executes them.

In step S1911, the CPU 311 starts the communication procedure with the information processing apparatus 200 by connection in the wireless direct mode. The communication procedure here is the above-described communication procedure. In step S1912, the CPU 311 determines whether the communication procedure between the MFP 300 and the information processing apparatus 200 is the communication procedure in which authentication processing is executed. The determination processing in step S1912 is performed based on, for example, setting contents, which control communication with the MFP 300, concerning whether an application in the information processing apparatus 200 executes authentication with the MFP 300, or negotiation with the information processing apparatus 200. If it is determined that it is the communication procedure in which authentication processing is executed, the process advances to step S1913; otherwise, the process advances to step S1916. Note that if connection in the wireless direct mode is in the authentication limited state, authentication of the information processing apparatus 200 in step S1913 may be executed independently of whether the application executes authentication.

In step S1913, the CPU 311 executes authentication of the information processing apparatus 200, as in step S1902. The authentication here may be done by transmitting an ID and password assigned to the information processing apparatus 200 from the information processing apparatus 200 to the MFP 300 and confirming these by the MFP 300. Alternatively, the authentication may be done by transmitting an administrator password and administrator ID set for the MFP 300 from the information processing apparatus 200 to the MFP 300 and confirming these by the MFP 300. Note that the authentication may be performed using not the ID and password but a challenge-and-response method, a client certificate, or a token. In step S1914, the CPU 311 determines whether the authentication succeeds. If it is determined that the authentication succeeds, the process advances to step S1915; otherwise, the process advances to step S1917.

If it is determined that the authentication succeeds, in step S1915, the CPU 311 continuously executes the communication procedure with the information processing apparatus 200. For example, based on information received from the information processing apparatus 200 via the communication procedure, the CPU 311 can execute printing of image data, scan of an image, change of settings, and the like. In addition, the CPU 311 can execute change of the IEEE802.1X/EAP setting of the MFP 300. On the other hand, if it is determined that the authentication fails, in step S1917, the CPU 311 interrupts the communication procedure with the information processing apparatus 200.

If it is determined in step S1912 that the communication procedure is not the communication procedure in which authentication processing is executed, in step S1916, the CPU 311 determines whether connection in the wireless direct mode is in the authentication limited state. If it is determined that the connection is in the authentication limited state, in step S1917, the CPU 311 interrupts the communication procedure with the information processing apparatus 200. On the other hand, if it is determined that the connection is not in the authentication limited state, in step S1915, the CPU 311 continuously executes the communication procedure with the information processing apparatus 200.

As described above, in connection in the wireless direct mode between the MFP 300 and the information processing apparatus 200, only the communication procedure in which authentication of application level or the like is executed, which is communication with the information processing apparatus 200 having the same access level as the access level to the MFP 300 by IEEE802.1X/EAP authentication, can be performed. Also, the setting of authentication of application level need not be changed in accordance with IEEE802.1X/EAP authentication.

FIG. 21 is a flowchart illustrating processing in the MFP 300, which is performed when starting the communication procedure by connection in the wireless direct mode. In the processing shown in FIG. 21, only communication in which the destination information of communication from the information processing apparatus 200 to the MFP 300 satisfies a condition is performed. Processing shown in FIG. 21 is implemented when, for example, the CPU 311 reads out programs stored in the program memory 313 and executes them.

In step S1921, the CPU 311 starts the communication procedure with the information processing apparatus 200 by connection in the wireless direct mode. The communication procedure here is the above-described communication procedure. In step S1922, the CPU 311 acquires destination information of communication from the information processing apparatus 200. Here, the destination information is, for example, information representing the destination on the side of the MFP 300, such as an IP address, a port number, a URL, or a query.

In step S1923, the CPU 311 determines whether the acquired destination information satisfies a predetermined condition. In step S1923, if communication corresponding to the destination information is communication including authentication processing, the CPU 311 determines that the predetermined condition is satisfied. The determination may be done based on, for example, the presence/absence of execution of authentication of application level. If it is determined that the predetermined condition is satisfied, the process advances to step S1924; otherwise, the process advances to step S1925.

If it is determined that the predetermined condition is satisfied, in step S1924, the CPU 311 continuously executes the communication procedure with the information processing apparatus 200. In the communication procedure, authentication of the information processing apparatus 200 is executed, as in steps S1902 and S1913. That is, in the authentication, authentication by an ID and password, a challenge-and-response method, a client certificate, or a token may be used. If the authentication fails, the communication procedure with the information processing apparatus 200 is interrupted. On the other hand, if it is determined in step S1923 that the predetermined condition is not satisfied, even if the communication procedure is continuously executed, authentication processing is not executed. Hence, in step S1925, the CPU 311 interrupts the communication procedure with the information processing apparatus 200.

As described above, in connection in the wireless direct mode between the MFP 300 and the information processing apparatus 200, for example, only the communication procedure in which authentication of application level is executed, which is communication with the information processing apparatus 200 having the same access level as the access level to the MFP 300 by IEEE802.1X/EAP authentication, can be performed.

As described above, according to each embodiment, if the MFP 300 is connected to a network in which IEEE802.1X/EAP authentication is enabled, even if an operation in the wireless direct mode is simultaneously performed, communication with the information processing apparatus 200 is restricted on the connection side in the wireless direct mode. Hence, even if the MFP 300 is connected in the wireless infrastructure mode to the network in which IEEE802.1X/EAP authentication is enabled, a deviation in the authentication level, in which connection in the wireless direct mode is performed without authentication, can be prevented.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201990, filed Dec. 13, 2021, which is hereby incorporated by reference herein in its entirety.

What is claimed is:

1. A communication apparatus capable of communicating with an information processing apparatus and an access point, the communication apparatus comprising:
   a memory containing instructions and a processor to execute the instructions to function as:
   an establishment unit configured to establish a connection between the access point and the communication apparatus;
   a first acceptance unit configured to accept a predetermined request of enabling in the communication apparatus a predetermined mode for performing a communication directly between the communication apparatus and the information processing apparatus without going through the access point;
   a first enabling unit configured to, in a case where the connection between the communication apparatus and the access point is established and an authentication method which was used in the connection between the communication apparatus and the access point is not a predetermined authentication method, enable in the communication apparatus the predetermined mode based on the predetermined request being accepted; and a control unit configured to, in a case where the connection between the communication apparatus and the access point is established and an authentication method which was used in the connection between the communication apparatus and the access point is the predetermined authentication method, perform a predetermined control for controlling the communication apparatus such that the predetermined mode is not enabled in the communication apparatus.

2. The communication apparatus according to claim 1, wherein in a case where the connection between the communication apparatus and the access point is not established, the predetermined mode is enabled in the communication apparatus based on the predetermined request being accepted.

3. The communication apparatus according to claim 1, wherein the predetermined request is a request issued by a user's predetermined operation performed on a user interface screen of the communication apparatus.

4. The communication apparatus according to claim 3, wherein the predetermined control is a process of graying out a button used to accept the predetermined operation, or a process of causing the button used to accept the predetermined operation not to be displayed.

5. The communication apparatus according to claim 1, wherein the predetermined request is a request which is transmitted from the information processing apparatus to the communication apparatus.

6. The communication apparatus according to claim 1, wherein the predetermined control is a control of causing the predetermined request not to be accepted.

7. The communication apparatus according to claim 1, wherein the predetermined control is a control of causing the predetermined mode not to be enabled in the communication apparatus even though the predetermined request is accepted.

8. The communication apparatus according to claim 1, wherein the instructions are further executed to function as:
a second acceptance unit configured to accept a specific request of enabling in the communication apparatus a specific mode for performing a communication between the communication apparatus and the information processing apparatus via the access point;
a second enabling unit configured to enable in the communication apparatus the specific mode based on the specific request; and
a disabling unit configured to, in a case where an authentication method to be used in a connection which is established between the communication apparatus and the access point based on the specific request is a predetermined authentication method, and the communication apparatus is in the predetermined mode when the specific request is accepted, disable the predetermined mode.

9. The communication apparatus according to claim 8, wherein in a case where the authentication method to be used in the connection which is established between the communication apparatus and the access point based on the specific request is the predetermined authentication method, and the communication apparatus is in the predetermined mode when the specific request is accepted, the specific mode is enabled after the predetermined mode is disabled.

10. The communication apparatus according to claim 8, wherein in a case where the authentication method to be used in the connection which is established between the communication apparatus and the access point based on the specific request is not the predetermined authentication method, and the communication apparatus is in the predetermined mode when the specific request is accepted, the specific mode is enabled while the predetermined mode is maintained.

11. The communication apparatus according to claim 8, wherein the specific request is a request which is issued by a user's specific operation performed on a user interface screen of the communication apparatus.

12. The communication apparatus according to claim 1, wherein the predetermined authentication method is an authentication method defined by IEEE 802.1X/EAP.

13. The communication apparatus according to claim 1, wherein an authentication method which is not the predetermined authentication method is a Personal method.

14. The communication apparatus according to claim 1, wherein an authentication method which is not the predetermined authentication method is one of Pre Shared Key (PSK) method and Simultaneous Authentication of Equals (SAE) method.

15. The communication apparatus according to claim 1, wherein the predetermined mode is a mode in which the communication apparatus operates as an access point.

16. The communication apparatus according to claim 11, wherein the predetermined mode is a mode for performing a communication by Wi-Fi Direct.

17. The communication apparatus according to claim 11, wherein the communication apparatus is a printer.

18. A non-transitory computer-readable storage medium storing a program causing a computer of a communication apparatus capable of communicating with an information processing apparatus and an access point to:
establish a connection between the access point and the communication apparatus;
accept a predetermined request of enabling in the communication apparatus a predetermined mode for performing a communication directly between the communication apparatus and the information processing apparatus without going through the access point;
in a case where the connection between the communication apparatus and the access point is established and an authentication method which was used in the connection between the communication apparatus and the access point is not a predetermined authentication method, enable in the communication apparatus the predetermined mode based on a fact that the predetermined request is accepted; and
in a case where the connection between the communication apparatus and the access point is established and an authentication method which was used in the connection between the communication apparatus and the access point is the predetermined authentication method, perform a predetermined control for controlling the communication apparatus such that the predetermined mode is not enabled in the communication apparatus.

19. A controlling method of a communication apparatus capable of communicating with an information processing apparatus and an access point, the method comprising:
establishing a connection between the access point and the communication apparatus;
accepting a predetermined request of enabling in the communication apparatus a predetermined mode for performing a communication directly between the communication apparatus and the information processing apparatus without going through the access point;
in a case where the connection between the communication apparatus and the access point is established and an authentication method which was used in the connection between the communication apparatus and the access point is not a predetermined authentication method, enabling in the communication apparatus the predetermined mode based on a fact that the predetermined request is accepted; and in a case where the connection between the communication apparatus and the access point is established and an authentication method which was used in the connection between the communication apparatus and the access point is the predetermined authentication method, performing a predetermined control for controlling the communication apparatus such that the predetermined mode is not enabled in the communication apparatus.

* * * * *